US009625167B2

(12) United States Patent
Choi et al.

(10) Patent No.: US 9,625,167 B2
(45) Date of Patent: Apr. 18, 2017

(54) HUMIDIFIER

(71) Applicant: SAMSUNG ELECTRONICS CO., LTD., Suwon-si (KR)

(72) Inventors: Jin Young Choi, Daejeon (KR); Jun Ho Ji, Namyangju-si (KR); Du Seop Yoon, Seongnam-si (KR); Byeong Cheol Yoon, Suwon-si (KR); Doo Woong Lee, Seoul (KR); You Seop Lee, Yongin-si (KR); Jun Young Lee, Daejeon-si (KR); In Sang Hwang, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 501 days.

(21) Appl. No.: 13/800,759

(22) Filed: Mar. 13, 2013

(65) Prior Publication Data
US 2014/0090562 A1   Apr. 3, 2014

(30) Foreign Application Priority Data

Mar. 13, 2012   (KR) .................. 10-2012-0025462

(51) Int. Cl.
*F24F 3/14*   (2006.01)
*F24F 3/16*   (2006.01)
*F24F 6/14*   (2006.01)

(52) U.S. Cl.
CPC ............... *F24F 6/14* (2013.01); *F24F 3/166* (2013.01); *F24F 2003/1635* (2013.01); *Y02B 30/545* (2013.01)

(58) Field of Classification Search
CPC ...... F24F 6/14; F24F 3/166; F24F 2003/1635; Y02B 30/545
See application file for complete search history.

(56) References Cited

U.S. PATENT DOCUMENTS 3,633,337 A * 1/1972 Walker et al. .............. 95/80
3,638,637 A * 2/1972 Coffman, Jr. ............. 126/113
(Continued)

FOREIGN PATENT DOCUMENTS

CN   1802219 A   7/2006
CN   101331028 A   12/2008
(Continued)

OTHER PUBLICATIONS

International Search Report dated Jun. 10, 2013 in corresponding International Patent Application PCT/KR2013/001994.
(Continued)

*Primary Examiner* — Amber R Orlando
*Assistant Examiner* — Britanny Precht
(74) *Attorney, Agent, or Firm* — Staas & Halsey LLP

(57) ABSTRACT

A humidifier including a spray unit configured to apply electric charge to water, and to spray water having electric charge applied thereto, an evaporation unit formed with a duct in which evaporation of the electrically-charged water being sprayed is taken place, and configured to guide a vapor and a foreign substance, which are separated from each other through the evaporation, to an outside, and a dust collection unit configured to collect the foreign substance at an inside the duct by forming an electric field, the humidifier capable of performing a large-capacity humidification by the generation of the electrically charged droplets, and capable of removing the foreign substance included in the droplets by using the electrical force, thereby enhancing the cleanliness of the humidification, and by using an electric field, accelerating the evaporation so that the size of the duct is minimized, and thus manufacturing the humidifier in a compact size.

29 Claims, 21 Drawing Sheets

(56) References Cited

U.S. PATENT DOCUMENTS

| | | | | |
|---|---|---|---|---|
| 3,664,092 | A * | 5/1972 | Vincent | 96/36 |
| 3,678,653 | A * | 7/1972 | Buschman | 96/66 |
| 3,791,633 | A * | 2/1974 | Lowe | 261/101 |
| 3,891,415 | A * | 6/1975 | Watanabe | 96/53 |
| 4,290,274 | A * | 9/1981 | Essex | 62/157 |
| 4,397,339 | A * | 8/1983 | Muller | 139/1 C |
| 4,541,966 | A * | 9/1985 | Smith | 261/27 |
| 4,661,129 | A * | 4/1987 | Nederman | B01D 46/0075 55/283 |
| 4,882,096 | A * | 11/1989 | Rueben | 261/30 |
| 4,967,728 | A * | 11/1990 | Dueck | 126/113 |
| 5,031,612 | A * | 7/1991 | Clementi | 128/204.14 |
| 5,037,585 | A * | 8/1991 | Alix et al. | 261/142 |
| 5,084,659 | A * | 1/1992 | Hayashi | B60H 1/008 236/49.1 |
| 5,341,986 | A * | 8/1994 | Galba et al. | 236/11 |
| 5,595,587 | A * | 1/1997 | Steed | 96/27 |
| 5,693,266 | A * | 12/1997 | Jung | 261/142 |
| 5,968,231 | A * | 10/1999 | Parmentier et al. | 95/28 |
| 6,017,381 | A * | 1/2000 | Dunn et al. | 95/3 |
| 7,494,532 | B2 * | 2/2009 | Azukizawa | B05B 5/0255 239/690 |
| 7,959,717 | B2 * | 6/2011 | Yano et al. | 96/27 |
| 2003/0012993 | A1 * | 1/2003 | Katagiri et al. | 429/26 |
| 2007/0048572 | A1 * | 3/2007 | Oglesby et al. | 429/26 |
| 2008/0242218 | A1 * | 10/2008 | Asano et al. | 454/338 |
| 2010/0001105 | A1 * | 1/2010 | Obata et al. | 239/690 |
| 2011/0114740 | A1 * | 5/2011 | Tanaka et al. | 236/44 A |

FOREIGN PATENT DOCUMENTS

| | | |
|---|---|---|
| CN | 101466465 A | 6/2009 |
| CN | 102032618 A | 4/2011 |
| CN | 102077030 A1 | 5/2011 |
| EP | 0 345 190 A1 | 12/1989 |
| EP | 0 654 640 A1 | 5/1995 |
| EP | 434 014 A2 | 6/2004 |
| JP | 2006-305321 | 11/2006 |
| JP | 2011-75164 | 4/2011 |

OTHER PUBLICATIONS

European Search Report dated Jul. 19, 2013 in corresponding European Patent Application 13158975.6.
Chinese Office Action dated Jun. 20, 2016 in corresponding Chinese Patent Application No. 201380014261.2 (31 pages with translation).
European Office Action dated Jul. 7, 2016 in corresponding European Patent Application No. 13 158 975.6 (3 pages).
Canadian Office Action dated Sep. 9, 2016 in corresponding Canadian Patent Application No. 2,867,319, 3 pages.
Chinese Patent Office Action issued in Chinese Patent Application No. 201380014261.2 dated Feb. 8, 2017 (7 pages).

* cited by examiner

| Droplet Diameter (um) | Droplet Lifetime(s) | | | | | | |
|---|---|---|---|---|---|---|---|
| | RHn = 5% | RHn = 75% | RHn = 80% | RHn = 85% | RHn = 90% | RHn = 95% | RHn = 99% |
| 5.0 | 0.044 | 0.094 | 0.118 | 0.16 | 0.24 | 0.4932 | 2.5 |
| 8 | 0.11 | 0.24 | 0.3 | 0.41 | 0.62 | 1.26 | 6.37 |
| 10.0 | 0.17 | 0.37 | 0.474 | 0.63 | 0.973 | 1.972 | 10 |
| 15.0 | 0.39 | 0.84 | 1.06 | 1.44 | 2.19 | 4.43 | 22 |
| 20.0 | 0.7 | 1.5 | 1.89 | 2.56 | 3.89 | 7.89 | 40 |

| Rho (%) | AMOUNT OF AIR (CMM) | EVAPORATION DISTANCE (m) | | |
|---|---|---|---|---|
| | | Droplet size 5um | Droplet size 8um | Droplet size 10um |
| 60 | 2.84 | 0.28 | 0.71 | 1.49 |
| 70 | 2.23 | 0.22 | 0.56 | 1.17 |
| 75 | 2.02 | 0.20 | 0.51 | 1.06 |
| 80 | 1.90 | 0.19 | 0.46 | 0.98 |
| 85 | 1.74 | 0.17 | 0.43 | 0.91 |

HUMIDIFIER

CROSS-REFERENCE TO RELATED APPLICATIONS

This application claims the priority benefit of Korean Patent Application No. 10-2012-0025462, filed on Mar. 13, 2012, in the Korean Intellectual Property Office, the disclosure of which is incorporated herein by reference.

BACKGROUND

1. Field

Embodiments of the present disclosure relate to a humidifier configured to spray water while the water is provided in clean status.

2. Description of the Related Art

A humidifier is an apparatus configured to increase or maintain humidity of air at an indoor, and sprays water in a state of droplets or ejects water to an outside in a form of vapor.

The types of the humidifier may include a heating-type humidifier, a ultrasonic-type humidifier, a combination-type humidifier having combined with the heating-type humidifier and the ultrasonic-type humidifier, a centrifugal atomization-type humidifier configured to release the small particles of water after having the water centrifugally floated and collided at a screen, or a filter vaporization-type humidifier configured to generate moisture by evaporating water after having the water passing through a wet filter.

From the above, the ultrasonic-type humidifier is configured to electrically change water into a state of microscopic droplets by using the vibration of an ultrasonic vibrator, and spray the microscopic droplets into a space by using the blowing blower force of a fan.

The humidifier configured to spray droplets as such is capable of adjusting the amount of the droplets being generated while the power consumption thereof is relatively small, but bacteria may spread in remaining water and thus the bacteria may be sprayed along with the droplets to be propagated into air at an indoor, while the minerals in the water may also be sprayed in a form of powder to bring pollution at an indoor.

In recent years, as to sterilize humidifiers, chemical sterilization products are developed, but as the controversy over the hazardous substance contained in the chemical sterilization products is intensified, a caution is needed to be applied by a user with respect to using the chemical sterilization products.

The filter vaporization-type humidifier is configured to humidify an indoor by use of the moisture being naturally evaporated in the process of passing air through a wet disc or a wet filter. In the case as such, since no droplets is generated, the clean humidification may be possible, but because of the principle of such, the amount of humidification per unit is small, and thus is less suitable for large-capacity humidification, and noise may also be generated by the driving of a fan configured to create an air flow at high air flow rate.

SUMMARY

Therefore, it is an aspect of the present disclosure to provide a humidifier configured to spray electrically-charged droplets.

It is another aspect of the present disclosure to provide a humidifier configured to evaporate droplets after combining the droplets with dry air at an indoor, while foreign substance, such as bacteria, micro-organism, or mineral particles that remains in the water after the evaporation is completed, is electrically removed, and thus the droplets in a clean state may be sprayed.

It is still another aspect of the present disclosure to provide a humidifier configured to perform a cleaning by controlling the rotation of a fan.

It is still another aspect of the present disclosure to provide a humidifier configured to adjust the amount of spray by controlling an opening degree of a valve of the humidifier.

Additional aspects of the disclosure will be set forth in part in the description which follows and, in part, will be obvious from the description, or may be learned by practice of the disclosure.

In accordance with an aspect of the present disclosure, a humidifier includes a spray unit and an evaporation unit formed with a duct. The spray unit may be configured to electrically charge water having foreign substance, and spray the electrically-charged water in a form of droplets. In the duct, the electrically-charged droplets sprayed may be changed from a liquid state into vapor in a gas state, and the duct may be configured to guide the changed vapor and the foreign substance, which is included in the electrically-charged water, to an outside.

The humidifier may further include a dust collection unit configured to collect the foreign substance in the duct by forming an electric field.

The duct may be configured to guide electrically-charged droplets, which are not evaporated among the electrically-charged droplets that are being sprayed, to an outside. The dust collection unit may be configured to collect the electrically-charged droplets that are not evaporated.

The humidifier may further include a blower unit. The blower unit may be configured to introduce outside air into the duct, and to add moving force to the electrically-charged droplets.

The humidifier may further include an input unit and a control unit. The input unit may be configured to input a cleaning mode. The control unit, when the cleaning mode is input, may be configured to control a rotation velocity of the blower unit so that the evaporation of the electrically-charged droplets is decreased.

The humidifier may further include a water storage chamber and a first pipe. The water storage chamber may be configured to store water and to supply the stored water to the spray unit. The first pipe may be connected in between the water storage chamber and the spray unit, and configured to guide the water stored at the water storage chamber to the spray unit.

The humidifier may further include a valve. The valve may be disposed at the first pipe and configured to adjust an opening degree of the first pipe so that a flow rate of water being supplied from the water storage chamber to the spray unit is adjusted.

The humidifier may further include an input unit and a control unit. The input unit may be configured to input a humidification mode and an amount of spraying. The control unit, when the humidification mode and the amount of the spraying are input, may be configured to control the opening degree of the valve based on the amount of the spraying being input.

The humidifier may further include a tray. The tray may be configured to store the electrically-charged droplets, which are not evaporated among the electrically-charged droplets being sprayed.

The humidifier may further include a second pipe, a pump and a filter. The second pipe may be connected in between the water storage chamber and the duct. The pump may be disposed at the second pipe and configured to pump the water of the duct to supply the water to the water storage chamber. The filter may be disposed at the second pipe and configured to filter the water to supply the filtered water to the pump.

The spray unit may include a body, a plurality of nozzles, a first conductive member, and a second conductive member. The body may include an accommodation unit configured to accommodate water, and a plurality of insertion holes. The plurality of nozzles may be respectively inserted into the plurality of insertion holes, and each configured to spray the water of the accommodation unit after being supplied with the water of the accommodation unit. The first conductive member may be configured to electrically charge water. The second conductive member may be installed while being spaced apart by a predetermined distance from the body, provided with a plurality of nozzle holes each formed at a corresponding position to the each of the plurality of nozzles, and to which an electric charge having a different polarity from a polarity of the first conductive member is being applied.

The plurality of nozzles may be separated from the plurality of insertion holes.

The humidifier may further include a first voltage generating unit. The first voltage generating unit may be configured to apply voltage to the first conductive member and the second conductive member.

The humidifier may further include an array member. The array member may be provided with the plurality of nozzles disposed thereto.

The dust collection unit may include a first dust collection member and a second dust collection member. The first dust collection member may be applied with an electric charge having a different polarity from a polarity of electrically-charged water. The second dust collection member may be applied with an electric charge having a different polarity from a polarity of the first dust collection member.

The first dust collection member may be positioned in close contact with the duct, and the second collection member may be positioned in between the first collection members.

The humidifier may further include a second voltage generating unit. The second voltage generating unit may be configured to apply voltage to the first dust collection member and the second dust collection member so that an electric field is formed in between the first dust collection member and the second dust collection member.

A length of the duct may be provided based on a size of the droplets and an evaporation time of the droplets.

The spray unit may include a spray chamber, a first conductive member, a piston, and a nozzle. The spray chamber may be configured to store water. The first conductive member may be provided at an inside the spray chamber, and configured to apply an electric charge to the water. The piston may be disposed at an inside the spray chamber to pressurize water. The nozzle may be configured to spray the water pressurized by the piston in a state of electrically-charged droplets.

The dust collection unit may include a filter at which an electric field is formed.

The dust collection unit may include a cyclone at which an electric field is formed.

The humidifier may further include a first conductive member, a second conductive member and a third conductive member. The first conductive member may be configured to electrically charge water of the spray unit. The second conductive member may be applied with an electric charge having a different polarity from a polarity of the first conductive member, and may be configured to eject the electrically-charged water to an outside by forming an electric field in between the first conductive member and the second conductive member. The third conductive member may be positioned on the duct, and may be applied with an electric charge having a different polarity from a polarity of the first conductive member. The third conductive member may be configured to add a relative velocity to the electrically-charged droplets by forming an electric field in between the first conductive member and the third conductive member.

The spray unit may include a body and a plurality of nozzles. The body may be provided with an accommodation unit to accommodate water formed thereto, and a plurality of insertion holes formed thereto. The plurality of nozzles may be respectively inserted into the plurality of insertion holes, and each configured to spray the water of the accommodation unit after being supplied with the water of the accommodation unit. The first conductive member may be positioned at the accommodation unit. The second conductive member may be installed while being spaced apart by a predetermined distance from the body, and may be provided with a plurality of nozzle holes each formed thereto at a corresponding position to the each of the plurality of nozzles.

The humidifier may further include a first voltage generating unit. The first voltage generating unit may be configured to apply a high voltage to the first conductive member, the second conductive member, and the third conductive member. The first voltage generating unit may be configured to apply a voltage larger than a voltage of the second conductive member to the third conductive member.

The dust collection unit may include a first dust collection member and a second dust collection member. The first dust collection member may be applied with an electric charge having a different polarity from a polarity of the first conductive member. The second dust collection member may be applied with an electric charge having a different polarity from a polarity of the first dust collection member. The humidifier may further include a second voltage generating unit. The second voltage generating unit may be configured to apply voltage to the first dust collection member and the second dust collection member so that an electric field is formed in between the first dust collection member and the second dust collection member.

The first dust collection member may be positioned in close contact with an inner circumferential surface of the duct, and the second dust collection member may be positioned in between the first collection members.

In accordance with another aspect of the present disclosure, a humidifier includes a spray unit, an evaporation unit formed with a duct and a dust collection unit. The spray unit may be configured to apply an electric charge to water, and to spray water having an electric charge applied thereto through vibration in a state of being electrically-charged. In the duct, evaporation of the electrically-charged water being sprayed may be taken place, and the duct may be configured to guide a vapor and a foreign substance, which are separated from each other through the evaporation, to an outside. The dust collection unit may be configured to collect the foreign substance at an inside the duct by forming an electric field.

The humidifier may further include a blower unit. The blower unit may be configured to introduce outside air into the duct, and to add moving force to the vapor and the foreign substance.

The dust collection unit may include a first dust collection member and a second dust collection member. The first dust collection member may be applied with an electric charge having a different polarity from a polarity of the electrically-charged water. The second dust collection member may be applied with an electric charge having a different polarity from a polarity of the first dust collection member.

The humidifier may further include a first voltage generating unit and a second voltage generating unit. The first voltage generating unit may be configured to apply high voltage to the water of the spray unit. The second voltage generating unit may be configured to apply voltage to the first dust collection member and the second dust collection member so that an electric field is formed in between the first dust collection member and the second dust collection member.

The humidifier may further include a first conductive member. The first conductive member may be configured to deliver the voltage generated at the first voltage generating unit to the water of the spray unit.

In accordance with another aspect of the present disclosure, a humidifier includes a first discharging unit and a second discharging unit. The first discharging unit may be configured to electrically charge water and to discharge the electrically-charged water in a form of droplets. The second discharging unit may be configured to discharge the electrically-charged droplets discharged from the first discharging unit as vapor in a gas state.

In accordance with an aspect of the present disclosure, through a generation of the electrically-charged droplets, a high-capacity humidification may e performed, and foreign substance in the droplets may be removed by use of electric power. As a result of the above, the cleanliness of the humidification may be enhanced.

In addition, by using an electric field, evaporation may be accelerated, and thus the size of the evaporation unit may be reduced, and as a result of the above, a humidifier may be manufactured provided in a compact size thereof.

BRIEF DESCRIPTION OF THE DRAWINGS

These and/or other aspects of the disclosure will become apparent and more readily appreciated from the following description of the embodiments, taken in conjunction with the accompanying drawings of which.

FIG. 19 is an illustration of a humidifier in accordance with another embodiment of the present disclosure.

FIG. 20 is an illustration of a humidifier in accordance with still another embodiment of the present disclosure.

DETAILED DESCRIPTION

Reference will now be made in detail to embodiments of the present disclosure, examples of which are illustrated in the accompanying drawings, wherein like reference numerals refer to like elements throughout.

FIG. 1 is an illustration of a humidifier in accordance with an embodiment of the present disclosure, and the humidifier will be described in conjunction with FIGS. 2 (2A and 2B) to 16.

Here, FIGS. 2A and 2B are a detailed illustration of a water storage chamber 200 provided at the humidifier in accordance with an embodiment of the present disclosure, FIG. 3 is a detailed illustration of a spray unit 300 provided at the humidifier in accordance with an embodiment of the present disclosure, and FIGS. 4 to 5 are exploded perspective views of the spray unit 300 provided at the humidifier in accordance with an embodiment of the present disclosure.

The humidifier includes a body 100, the water storage chamber 200, the spray unit 300, an evaporation unit 400, a dust collection unit 500, and a blower unit 600.

The body 100 is configured to form an exterior appearance of the humidifier, and includes an accommodation space having the water storage chamber 200, the spray unit 300, the evaporation unit 400, the dust collection unit 500, and the blower unit 600, and an ejection unit 110 through which vapor is ejected.

The water storage chamber 200 is configured to store the water that is to be used for humidifying an indoor, and to supply the stored water to the spray unit 300.

As illustrated on FIG. 2A, the water storage chamber 200 includes a first housing 210 that forms an exterior appearance of the water storage chamber 200. At a bottom surface of the first housing 210, a plurality of holes 220 configured to discharge water is formed, and a first pipe 230 is mounted at each of the plurality of holes 220 to guide the water at an inside the first housing 210 to the spray unit 300.

Figure 1:
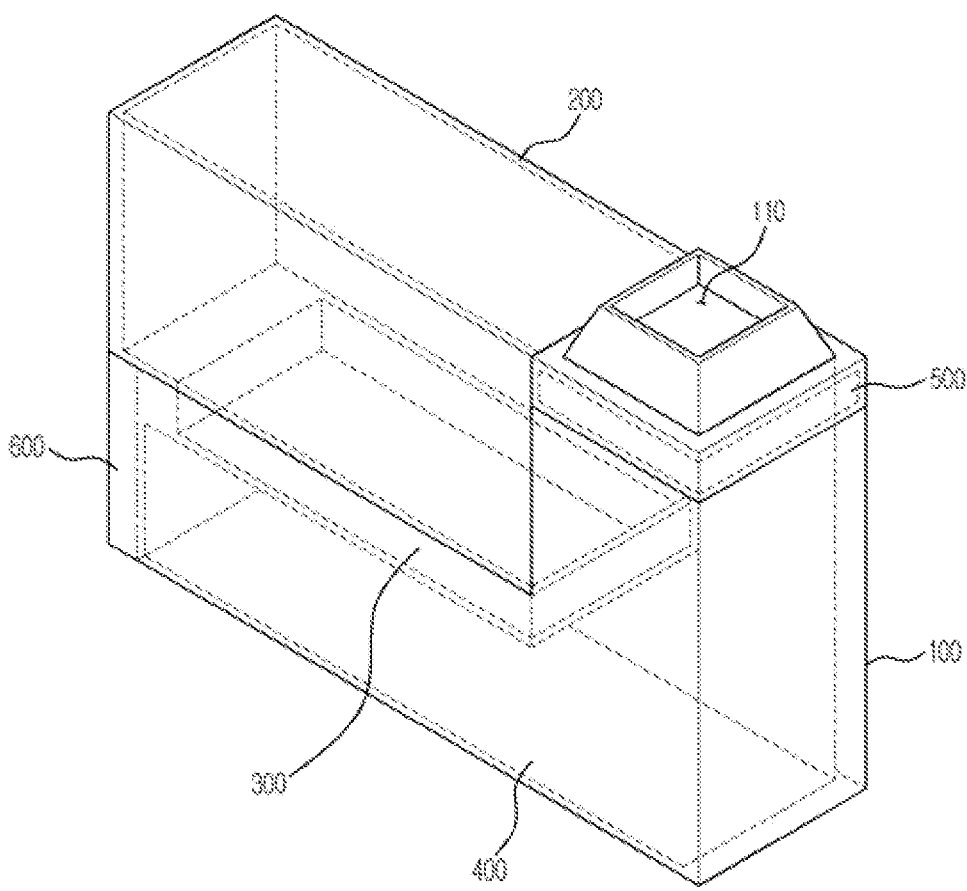
FIG. 1 is an illustration of a humidifier in accordance with an embodiment of the present disclosure.

The number of the plurality of the holes 220 corresponds to the number of spray assemblies that form the spray unit 300. However, only a single hole 220 may be included in the bottom surface of the first housing 210 so that a single first pipe 230 is connected to the single hole 220.

Figure 2A:
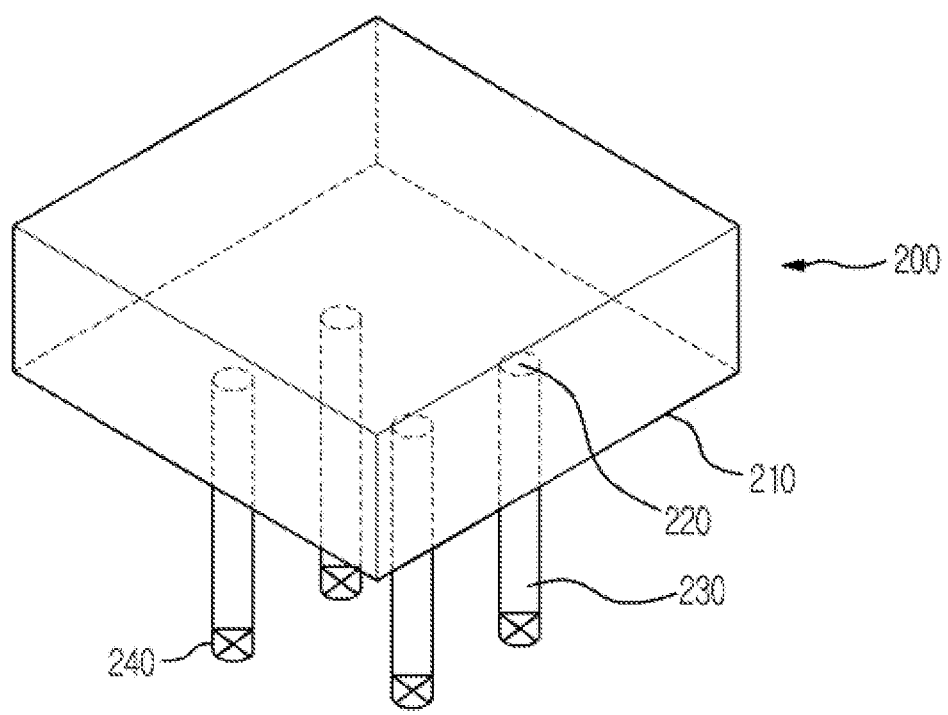
FIGS. 2A and 2B are a detailed illustration of a water storage chamber provided at the humidifier in accordance with an embodiment of the present disclosure.
Figure 2B:
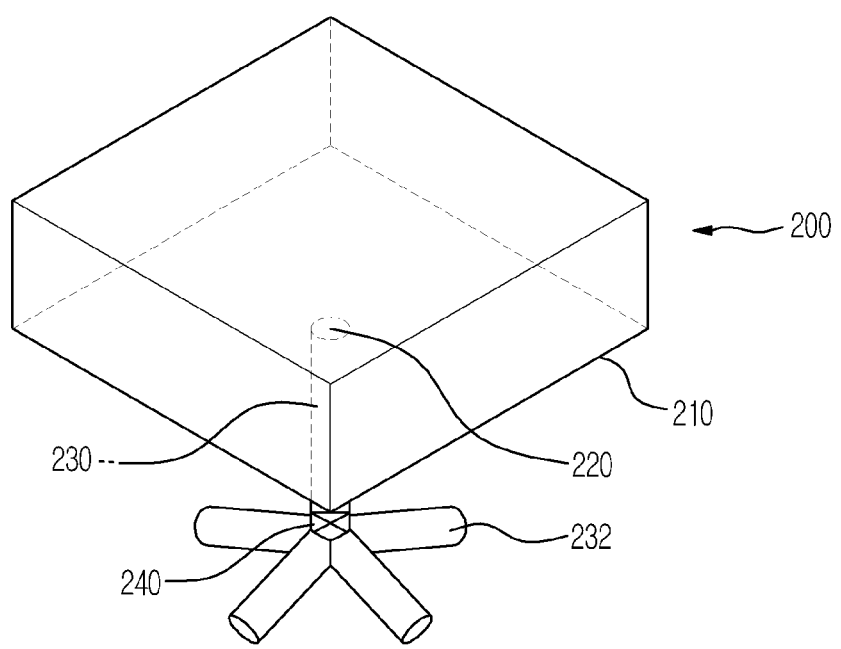

As illustrated on FIG. 2B, the first housing 210 may include only a single hole 220. To the hole 220, a single first pipe 230 is connected.

The first pipe 230 includes a plurality of branch pipes 232. At this time, the number of the branch pipes 232 branched from the first pipe 230 corresponds to the number of the plurality of spray assemblies.

The humidifier may also include a valve 240 configured to adjust the flow rate of water that flows through the first pipe 230.

That is, in a case of a humidification mode, when the amount of spray is selected by a user, the humidifier controls the opening degree of the valve 240 based on the selected amount of the spray, so that the degree of the opening of the flow path at an inside the first pipe 230 is adjusted, and thereby the amount of the water that flows through the first pipe 230 is adjusted, and in a case of the humidification mode is being released, the valve 240 is OFF-controlled, so that the flow path is closed.

As described above, a nozzle 320 of the spray unit 300 is connected to the water storage chamber 200 through the valve 240 connected to the first pipe 230, thereby spraying a predetermined amount of the water by using the pressure of a hydraulic head.

The spray unit 300 is positioned at a lower side of the water storage chamber 200, and is supplied with water from the water storage chamber 200 through the first pipe 230. The spray unit 300 electrically charges the water that is supplied from the water storage chamber 200, and sprays the electrically-charged water in the form of electrically-charged droplets.

The spray unit 300 as such will be described by referring to FIGS. 3 to 6.

Figure 3:
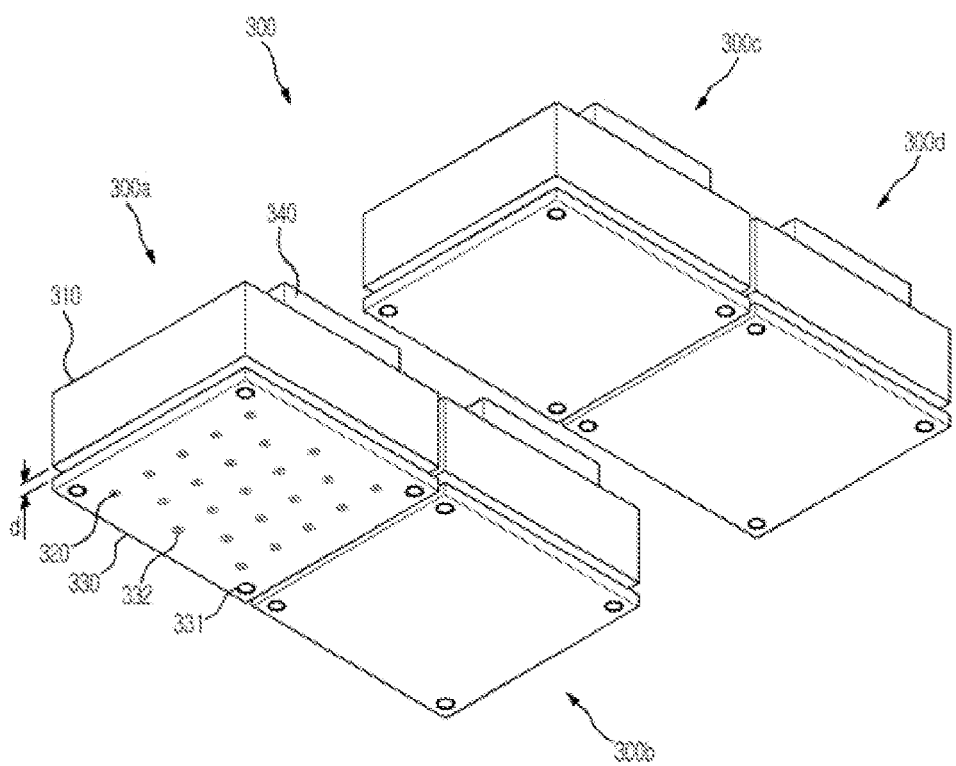
FIGS. 3 to 7 are detailed illustrations of a spray unit provided at the humidifier in accordance with an embodiment of the present disclosure.

As illustrated in FIG. 3, the spray unit 300 includes a plurality of spray assemblies 300a, 300b, 300c, and 300d. Although four spray assemblies are shown in FIG. 3, the number of the spray assemblies may be a single or a plurality of assemblies.

To each of the plurality of spray assemblies 300a, 300b, 300c, and 300d, the first pipe 230 is connected. That is, each of the plurality of spray assemblies 300a, 300b, 300c, and 300d is supplied with water through the first pipe 230, and sprays the supplied water to the evaporation unit 400.

Each of the plurality of spray assemblies 300a, 300b, 300c, and 300d as such is formed in the same structure with respect to each other. From the above, the spray assembly 300a will be described as an example.

The spray assembly 300a includes a body 310 provided with an accommodation unit 312 accommodating water formed thereto, a first conductive member 318 provided at an inside the accommodation unit 312 of the body 310, a plurality of nozzles 320 to spray water, a second conductive member 330 installed at the body 310 while being spaced apart by a predetermined distance from the body 310, and a fixing member 340 configured to fix the spray assembly 300a to the water storage chamber 200.

Here, to the first conductive member 318, the electric charge of a first polarity configured to electrically charge the water of the accommodation unit 312 is applied, and to the second conductive member 330, the electric charge of a second polarity, which is the opposite polarity to the first polarity, is applied.

For example, in a case when the electric charge of a positive polarity is applied to the first conductive member 318, the second conductive member 330 is applied with the electric charge of a negative polarity or grounded, and in a case when the first conductive member 318 is applied with the electric charge of a negative polarity or grounded, the electric charge of a positive polarity is applied to the second conductive member 330.

According to the above, in between the first conductive member 318 and the second conductive member 330, an electric field is formed.

Figure 4:
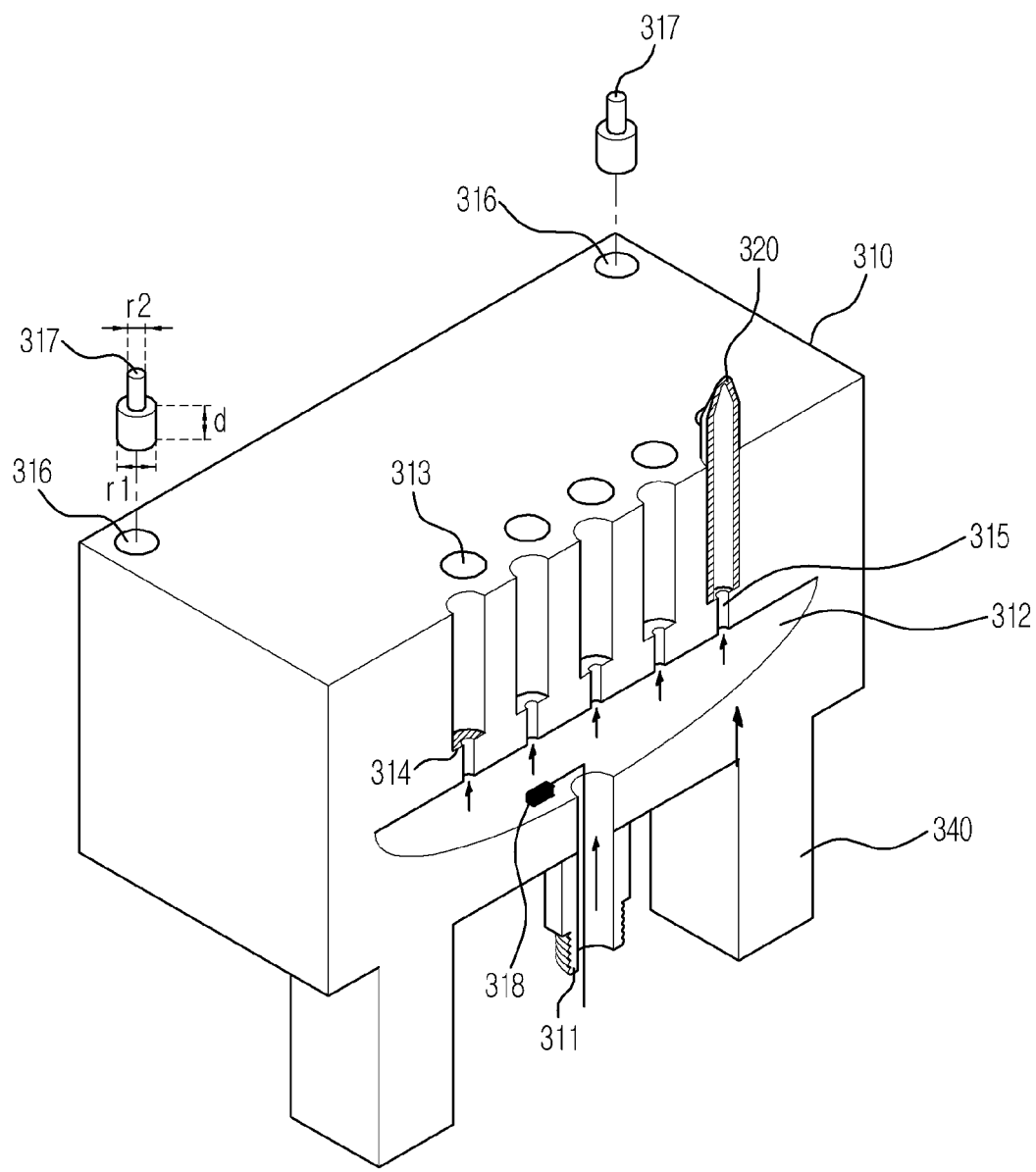

As illustrated on FIG. 4, the body 310 includes a flow path member 311 protrudedly formed toward an outside to be connected to the first pipe 230, and the accommodation unit 312 to accommodate the water that is supplied through the flow path member 311.

Here, the flow path member 311 is provided with a first flow path, through which the water being supplied through the first pipe 230 is being moved.

In addition, a plurality of insertion holes 313 is formed at the body 310. Into each of the plurality of insertion holes 313, the nozzle 320 is inserted. For the above, the diameter of each of the plurality of insertion holes 313 corresponds to the diameter of the nozzle 320, and thereby the nozzle 320 may come into close contact with each of the plurality of insertion holes 313.

At an inside of each insertion hole 313, a settling unit 314 at which the nozzle 320 is settled is formed, and thereby the plurality of nozzles 320 may be inserted into the insertion holes 313 at an even depth with respect to each other, and the height of the nozzle 320 being protruded from the body 310 may be provided to be even with respect to each other.

The insertion hole in between the settling unit 314 and the accommodation unit 312 is configured to form a second flow path 315 through which water flows, and the diameter of the second flow path 315 corresponds to the diameter of the flow path at an inside the nozzle 320.

That is, when the nozzle 320 is inserted into the insertion hole 313, the second flow path 315 and the flow path at an inside of the nozzle 320 are connected to each other, and thereby the water of the accommodation unit 312 flows through the flow path of the nozzle 320 and through the second flow path 315.

The body 310 further includes a plurality of connection grooves 316. Each of the plurality of connection holes 316 is referred to as a groove to which the second conductive member 330 is connected.

The body 310 further includes a plurality of connection members 317 configured to connect the plurality of connection grooves 316 to the second conductive member 330.

The connection member 317, while provided with one end portion thereof connected to the connection groove 316, and provided with the other end portion inserted into a connection hole 331 of the second conductive member 330, mechanically connects the body 310 to the second conductive member 330.

At this time, by forming a diameter 'r1' of one end portion of the connection member 317 to be larger than a diameter 'r2' of the other end portion of the connection member 317, the second conductive member 330 is fixed to the body 310 while in a state of being spaced apart from the body 310 by a predetermined distance 'd'.

That is, by having the diameter 'r2' of the other end portion of the connection member 317 corresponded to the diameter of the connection hole 330 formed at the second conductive member 330, the second conductive member 330 is settled in the middle of the connection member 317 in a state that the second conductive member 330 is inserted into the connection member 317.

At this time, the body 310 and the second conductive member 330 are electrically separated from each other.

Here, the connection member 317 may be integrally formed with the body 310.

The body 310 includes the first conductive member 318 configured to electrically charge water. At this time, the first conductive member 318 is positioned at an inside the accommodation unit 312 after being inserted through the flow path member 311. The first conductive member 318 as such makes contact with the water that is accommodated at an inside the accommodation unit 312.

According to the above, in a case when the electric charge of a positive polarity is applied to the first conductive member 318, the electric charge of a positive polarity is delivered to the water of the accommodation unit 312, and thus the water of the accommodation unit 312 is electrically charged with a positive polarity, and the water is sprayed in a form of droplets through the nozzle 320 while in a state of being electrically charged with a positive polarity.

The first conductive member 318 may be installed adjacent to the nozzle 320. At this time, the nozzle 320 may be conducted.

That is, in a case when the electric charge of a positive polarity is applied to the first conductive member 318, the electric charge of a positive polarity applied to the first conductive member 318 is applied to the nozzle 320, and thus the electric charge of a positive polarity applied to the nozzle 320 is delivered to the water at an inside the nozzle 320. As a result, the nozzle 320 sprays the water, which is electrically charged with the electric charge of a positive polarity, in a state of droplets.

The plurality of nozzles 320, when spraying liquid, is manufactured such that spray is electrically achieved by the electric field that is concentrated at a microscopic tip of the nozzle, and is provided with a flow path, through which liquid may flow, formed at an inside thereof.

When the nozzle 320 as such is inserted into the insertion hole 313 of the body 310, the flow path at an inside the nozzle 320 is connected to the second flow path 315 at an inside the body 310.

Through the above, the water at an inside the water storage chamber 200 is sprayed to an outside in a state of electrically charged microscopic droplets through the accommodation unit 312 of the body 310, the second flow path 315 of the body 310, and the flow path of the nozzle 320. That is, the plurality of nozzles 320 each sprays the electrically charged water in a form of electrically charged droplets.

Each spray assembly, as a non-limiting example, may include the total of one hundred four nozzles that are disposed while being spaced apart by a distance of about 2.5 mm from each other.

The spray unit 300 as such includes about four spray assemblies, and the size of the total cross-section area of the spray unit 300 is about 5 cm in width and about 5 cm in length. The size as such is the size similar to a spray tub at which a vibrator of the ultrasonic-type humidifier is mounted, and through the spray rate of about 1 cc/h for each nozzle, the spray at the rate of about 400 cc/h, which is the standard amount of humidification for a size of about 28.1 square meters (about 8.5 pyoung (a Korean unit of the size of rooms or buildings)), may be performed.

As the above, by using the plurality of nozzles, the electrically-charged droplets are sprayed, an indoor may be humidified through a clean state of vapor, and an indoor may be humidified by a sufficient amount of vapor.

The second conductive member 330 is positioned at a predetermined distance 'd' from the body 310, for example, at a distance of about 3 cm from the body 310.

The second conductive member 330 includes the plurality of connection holes 331. Into each of the plurality of connection holes 331, the connection member 317 is inserted, and thus the second conductive member 330 and the body 310 are mechanically connected to each other.

The second conductive member 330 includes a plurality of nozzle holes 332.

Figure 5:
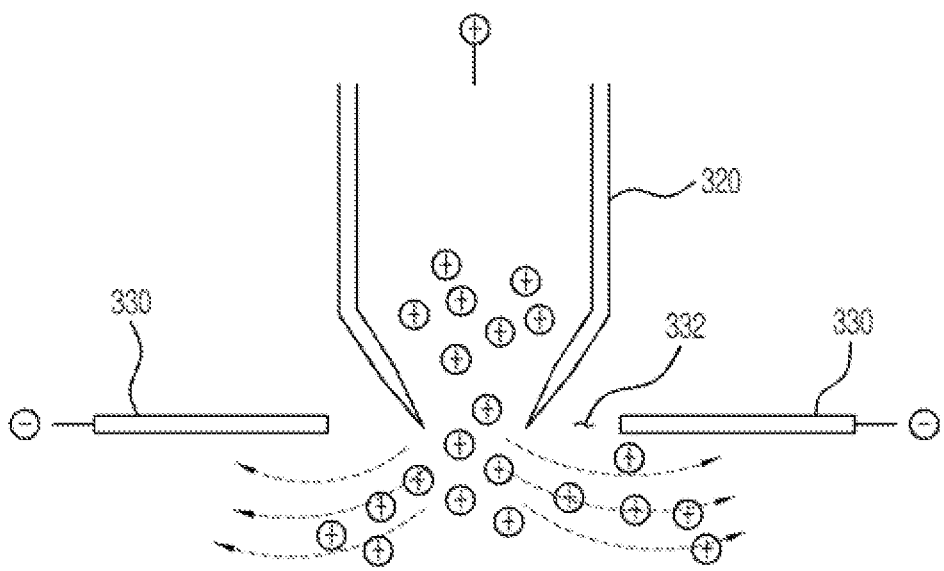

As illustrated on FIGS. 3 to 5, the positions of the plurality of nozzle holes 332 formed at the second conductive member 330 correspond to the positions of the plurality of nozzles 320, respectively, and the nozzle holes 332 are respectively adjacent to the nozzles 320 while being mechanically separated from the nozzles 320.

Through each nozzle hole 332, the plurality of nozzles 320 is exposed to an outside, and as a result of the above, the nozzle 320 may be able to spray droplets to an outside through the nozzle hole 332.

To the second conductive member 330, the electric charge of an opposite polarity to the polarity of the first conductive member 318 is applied.

In a case when the electric charge of a positive polarity is applied to the first conductive member 318, the second conductive member 330 is applied with the electric charge of a negative polarity or grounded, and in a case when the first conductive member 318 is applied with the electric charge of a negative polarity or grounded, the electric charge of a positive polarity is applied to the second conductive member 330.

Because of the above, an electric field is formed in between the nozzle hole 332 of the second conductive member 330 and the nozzle 320. At this time, the voltage between the two polarities is about 15 kV, for example.

As illustrated on FIG. 5, in a case when the electric charge of a negative polarity is applied to the second conductive member 330 and the electric charge of a positive polarity is applied to the water at an inside the nozzle 320, an attractive force is created in between the second conductive member 330 and the nozzle 320. Because of the above, the electrically-charged water at an inside the nozzle 320 is being pulled out toward the nozzle hole 332 of the second conductive member 330.

To describe the above more in detail, in between the water at an inside the water storage chamber 200 and the water at an inside the end portion of the nozzle 320, a hydraulic force acts.

When the voltage is blocked from being applied to the nozzle 320 and the second conductive member 330, the nozzle 320 and the second conductive member 330 are provided with the same potential, and as a result of the above, the hydraulic force forms a balance. Thus, the water at an inside the nozzle 320 is not leaked to an outside.

On the other hand, when voltage is applied to the nozzle 320 and the second conductive member 330, in between the nozzle 320 and the second conductive member 330, a potential difference is occurred, and as a result of the above, an electric field is formed at the surroundings of the end portion of the nozzle 320. In addition, the water at an inside the nozzle 320 is polarized, and positive electric charges gather around the end portion of the nozzle 320. In addition, the Coulomb force is applied to the water at an inside the nozzle 320. As a result of the above, the water is pulled from the end portion of the nozzle 320, and the water forms a shape of a cone, and, the water starts to be scattered from the top point of the cone-shaped water and sprayed in a form of droplets.

In a case when the water at an inside the nozzle 320 is electrically charged with a positive polarity, the droplets are sprayed in a state of being electrically charged with a positive polarity.

The fixing member 340 is a member configured to fix the spray assembly 300a to an inside the body 100.

The fixing member 340 is positioned at a surface of the body 310 of the spray assembly 300a except for a surface of the body 310 of the spray assembly 300a from which the water is sprayed.

The fixing member 340 as such may be mounted at a wall surface of the water storage chamber 200 or at a wall surface of the body 100. As a result of the above, the shaking of the spray assembly 300a by the force of the water being sprayed may be prevented.

Figure 6:
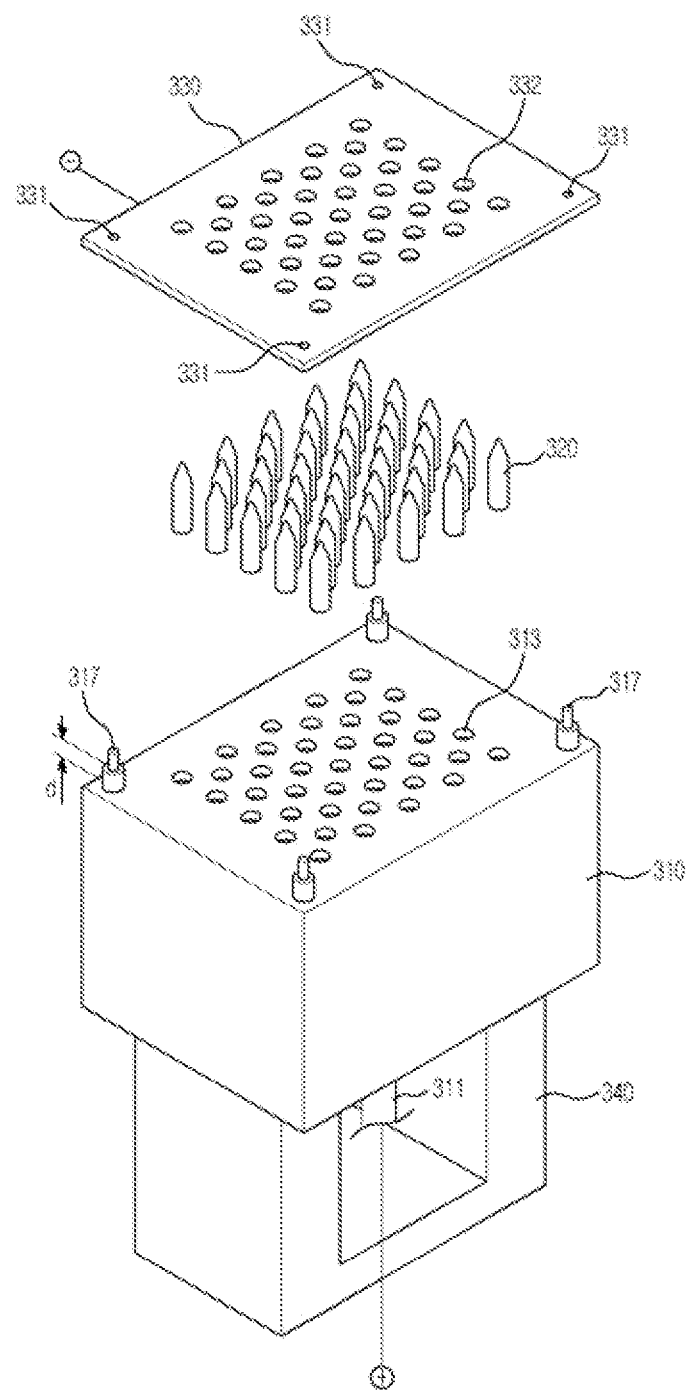
Figure 7:
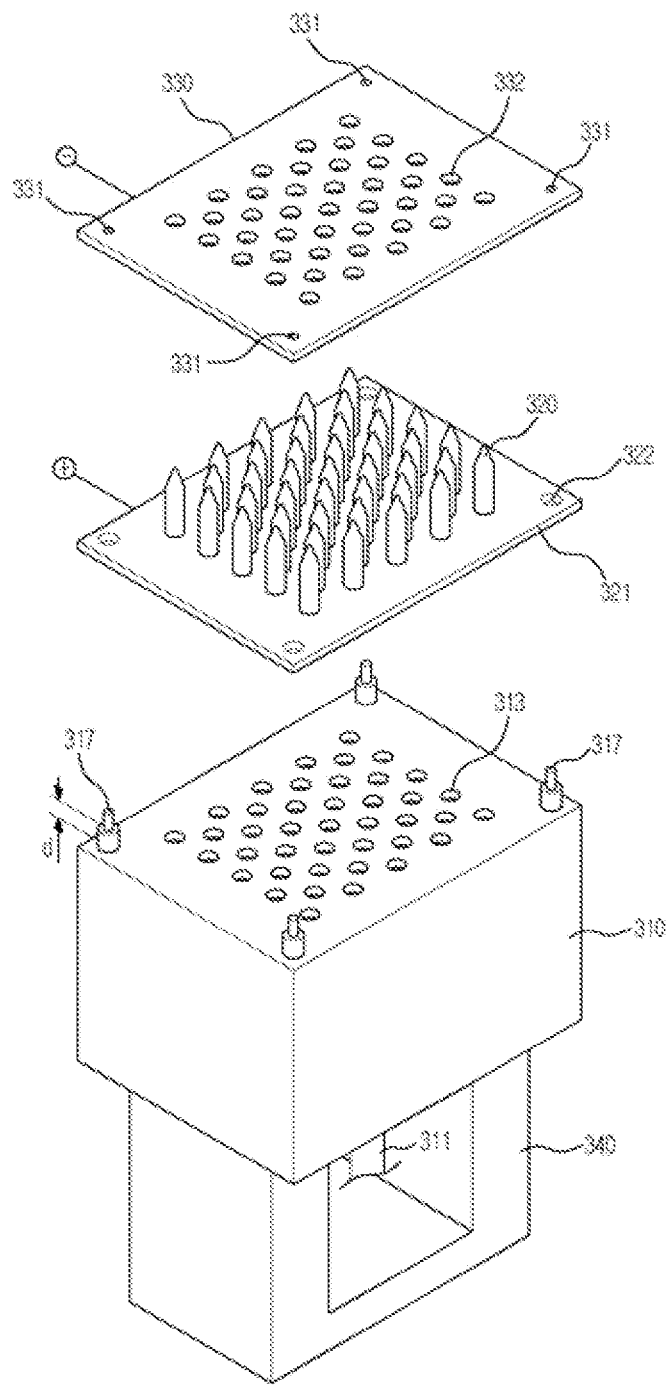
Figure 8:
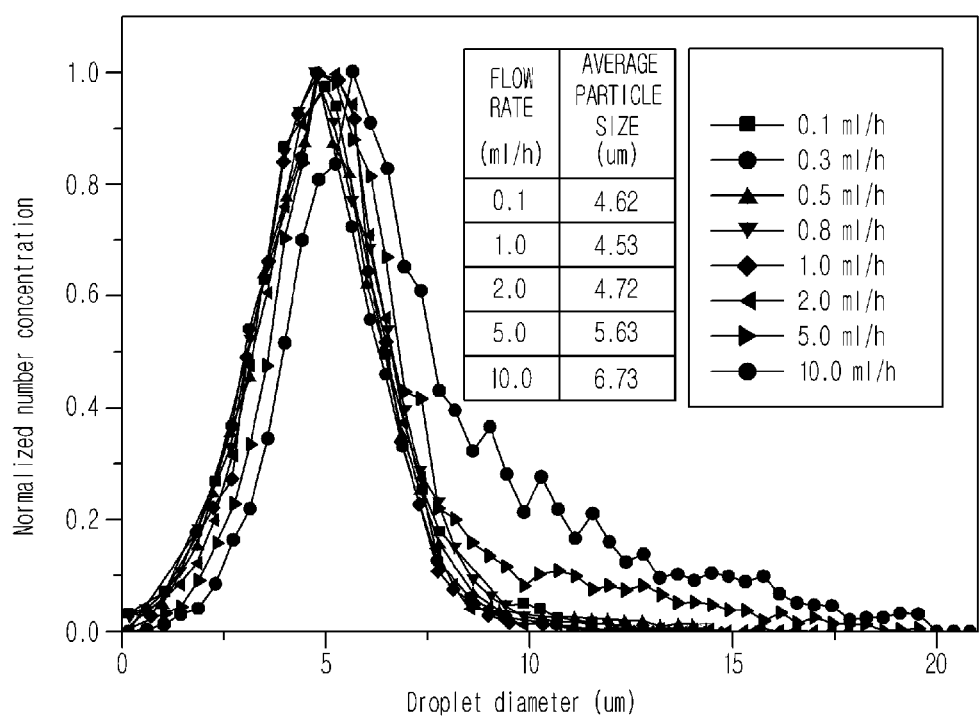
FIG. 8 is a distribution graph of the size of droplets according to flow rate of the humidifier in accordance with an embodiment of the present disclosure.
Figure 9:
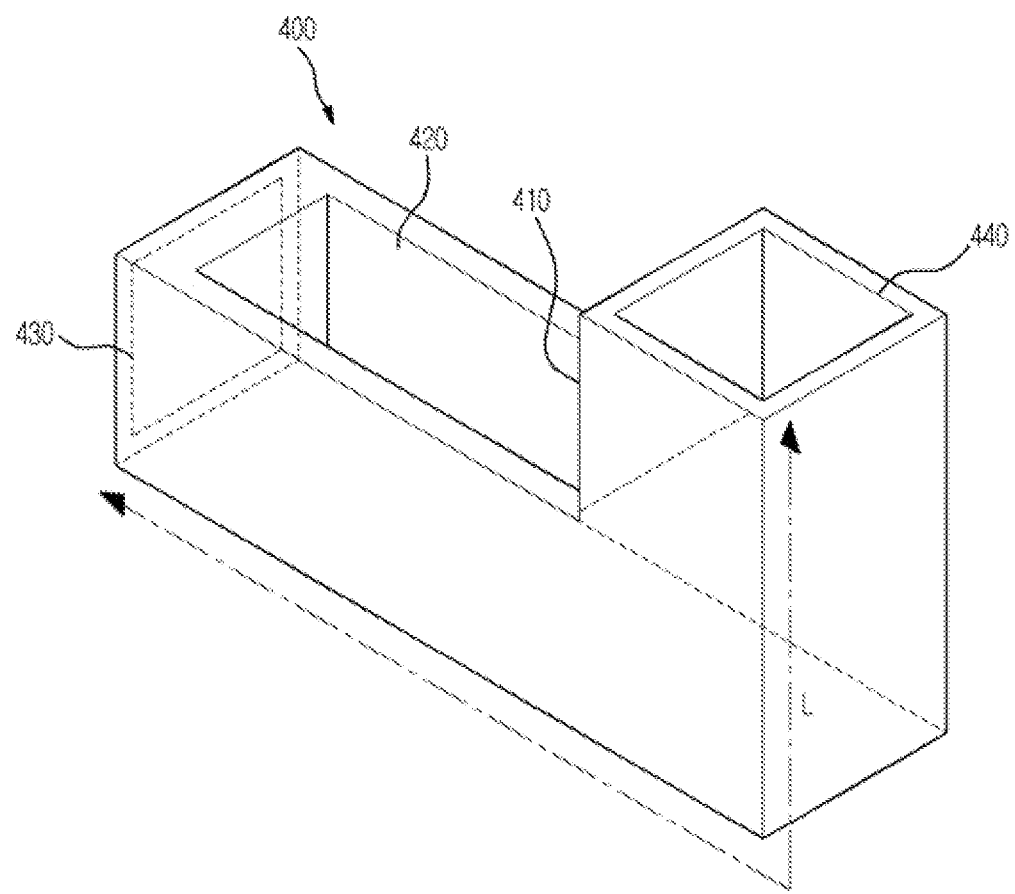
FIG. 9 is a detailed illustration of an evaporation unit provided at the humidifier in accordance with an embodiment of the present disclosure.

As illustrated on FIG. 6 and FIG. 7, the plurality of nozzles 320 of the spray assembly 300a each may be formed in a separate shape, or may be formed in a shape of an array in which the plurality of nozzles 320 of the spray assembly 300a is connected to each other.

As illustrated on FIG. 6, in a case when the plurality of nozzles 320 each is formed in a separated shape, the first conductive member 318 may be mounted at each nozzle 320, or, the first conductive member 318 may be positioned at the accommodation unit 312 at an inside the body 310.

As illustrated on FIG. 7, in a case when the plurality of nozzles 320 is formed in a shape of an array, the first conductive member 318 may be mounted at an array member 321 at which the plurality of nozzles 320 is formed. At this time, the array member 321 and the plurality of nozzles 320 are formed of conductive material through which electric charge may flow.

The array member 321 includes second connection holes 322. At this time, the position of the second connection hole 322 corresponds to the position of the connection groove 316 so that the connection member 317 may be inserted into the second connection hole 322, and the diameter of the second connection hole 322 corresponds to the diameter of a body of the connection member 317.

According to the above, the connection member 317 is inserted into the second connection hole 322, and when the array member 321 is pushed toward the body 310, the array member 321 is in contact with the body 310, and at this time, the plurality of nozzles is inserted into the insertion holes 313. As a result of the above, the array member 321 and the plurality of nozzles may be fixed to the body 310.

As illustrated on FIG. 6 and FIG. 7, by applying electrical force to the water at an inside the plurality of nozzles 320 of the spray unit 300, the electrically-charged droplets being sprayed through the nozzles may be sprayed in mono-size distribution. At this time, by using only the electrical force, the spraying of the droplets and the charging of the droplets may be possible.

The electrically-charged droplets sprayed through the nozzles are provided with the mono-size distribution by the space-charge effect, and since the surfaces of the droplets are electrically charged, the droplets are hardly coupled to each other, and thus the flow control of the electrically-charged droplets may be easily performed, and in addition, since the shape and the structure of the nozzles are simple, the manufacturability of the spray unit is superior.

As illustrated on FIG. 8, the electrostatic spray method as such, when compared to other spray methods, may be able to generate the droplets each having a microscopic size of about several units of nm to several units of um.

FIG. 8 is a distribution graph of the size of droplets according to flow rate of water being sprayed through the plurality of nozzles 320.

FIG. 8 is a graph showing a result of the measurement of the size of the droplets, which are sprayed using the nozzle 320, by using a PDPA (Phase Doppler Particle Analyzer) at a distance spaced apart by about 2 cm from the end portion of the nozzle 320.

Under the spray condition of 1 ml/h per nozzle, most of the sprayed droplets are measured at less than the size of about 10 um.

More in detail, the geometric mean size of the particle of each droplet is about 4.5 um, and based on the number of the droplets as a reference, more than 66% of the droplets are less than about 5 um and more than 99% of the droplets are less than about 8 um.

Based on the volume of the sprayed droplets, about 33% of the total amount of the sprayed droplets is sprayed in a form of droplets having less than about 5 um, and about 90% of the total amount of the sprayed droplets is sprayed in a form of droplets having less than about 8 um.

The evaporation unit 400 is referred to a space from which the sprayed droplets from the spray unit 300 are evaporated, and when the droplets are evaporated, the vapor generated by the evaporation of the droplets and the foreign substance that remains after the evaporation are guided to an outside. At this time, the vapor evaporated from the electrically-charged droplets is in a neutral state, and by the evaporation of the vapor, the electrically-charged droplets is provided only with foreign substance having a positive polarity.

The evaporation unit 400 is formed with a duct, and the droplets are naturally evaporated at an inside the evaporation unit 400.

That is, the foreign substance containing water at an inside the water storage chamber is discharged in the form of electrically charged droplets, which are in a liquid state, from the spray unit, and the electrically-charged droplets at an inside the evaporation unit, which is the duct, are changed into vapor, which is in a gas state, and discharged to an outside. At this time, the foreign substance included in the electrically-charged water at an inside the duct is remained in the duct.

According to the above, the spray unit may be distinguished as a first discharging unit, and the evaporation unit may be distinguished as a second discharging unit.

As illustrated on FIG. 9, the evaporation unit 400 includes a second housing 410 that forms an exterior appearance of the evaporation unit 400.

The second housing 410 includes a first inlet port 420 through which the electrically-charged droplets are introduced, a second inlet port 430 through which outside air is introduced, and an outlet port 440 through which vapor, the electrically-charged droplets, and foreign substance are discharged, and the second housing 410 includes a space at which the electrically-charged droplets that are sprayed from the spray unit 300.

The first inlet port 420 is provided to face a spraying side of the spray unit 300. As a result of the above, the droplets sprayed from the spray unit 300 are introduced into the evaporation unit 400 through the first inlet port 420.

As to prevent the droplets sprayed from the spray unit 300 from being leaking to an outside the evaporation unit 400, the nozzles of the spray unit 300 each may be partially inserted into an inside the evaporation unit 400 through the first inlet port 420.

The second inlet port 430 is provided to oppose the blowing direction of the blower unit 600. As a result of the above, the air generated at the blower unit 600 is introduced into the evaporation unit 400 through the second inlet port 430.

The outlet port 440 is referred to as an opening configured to discharge the vapor evaporated from the electrically-charged droplets, and foreign substance that remains after the electrically-charged droplets are evaporated, and the electrically-charged droplets that are not evaporated to the outside, that is, the indoor space.

The second housing 410 is illustrated as provided with a curvature shape, but the second housing 410 may be formed in a linear shape according to the direction of the droplets being sprayed.

The length of the second housing 410 is determined based on the evaporation time of the droplets needed for the evaporation of the droplets at each different size of the droplets.

Here, the evaporation time may be estimated based on the size of the droplets, the relative level of humidity (RHn) at an inside the evaporation unit, and the relative humidity (Rho) of the outlet port 440 of the evaporation unit.

Under the condition in which the relative velocity with respect to outside air is not being considered, the evaporation time of the droplets each having the particle size of about '$d_p$' may be estimated using the following formula:

$$t = \frac{R\rho_p d_p^2}{8D_v M\left(\frac{P_d}{T_d} - \frac{P_\infty}{T_\infty}\right)} \text{ for } d_p > 1.0 \text{ μm}$$

Here, the 't' is referred to as the droplet life time or the evaporation time, the 'R' is referred to as the gas constant, the '$\rho_p$' as the density of the droplet, the '$d_p$' as the diameter of the droplet, the '$D_v$' as the diffusion coefficient of the droplet molecule in air, the 'M' as the molecular weight of the droplet, the '$P_d$', and the '$T_d$' as the 'p' partial pressure at the droplet surface and the 'T' the temperature at the droplet surface, respectively, and the '$P_\infty$' and the '$T_\infty$' as the 'p' partial pressure of the air away from the droplet surface and the 'T' the temperature of the air away from the droplet surface, respectively.

Figures 10, 11A:
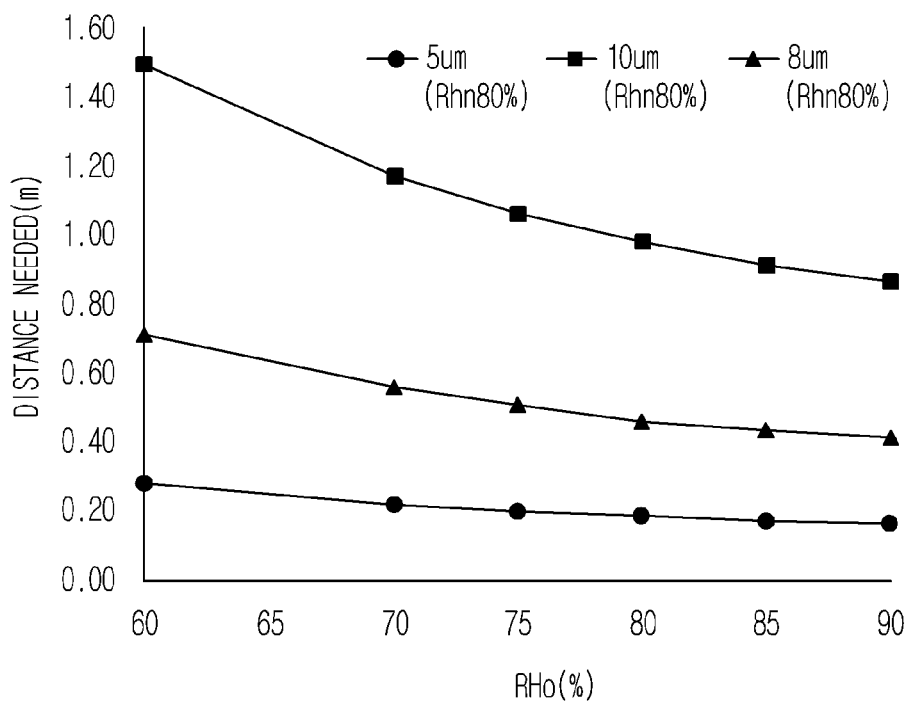
FIG. 10 is a table showing a by-size evaporation time of the droplets that are being sprayed from the humidifier in accordance with an embodiment of the present disclosure.
FIGS. 11A and 11B illustrate a graph and a table of a by-size evaporation distance of the droplets that are being sprayed from the humidifier in accordance with an embodiment of the present disclosure.

The result of the evaporation time of the droplet, which is calculated by the formula as such, calculated by the size of each droplet is same as FIG. 10. That is, FIG. 10 is a table showing the evaporation time of the droplets according to the sizes of the droplets and the relative humidity of the surrounding air of the droplets in numeric figures.

As illustrated on FIG. 10, the evaporation time of the droplets may show a deviation according to the relative level of humidity (RHn) of the surrounding air of the droplets, but in a case of the droplet of the size of about 8 um when the RHn is about 80%, after about 0.3 seconds of time being passed, the droplet is completely evaporated.

In a case of the droplet of the size of less than about 8 um, a shorter time is estimated to be needed.

As the above, based on the estimated evaporation time at each different size of the droplets, the length of the evaporation unit 400 may be estimated. The above will be described by referring to FIGS. 11A and 11B.

The evaporation unit 400 is referred to as an evaporation unit having a rectangular cross-sectional area provided with the width and the length thereof of about 10 cm, respectively, and in a case when the relative level of humidity at an inside the evaporation unit is about 80% will be described as an example.

Figures 11B, 12A:
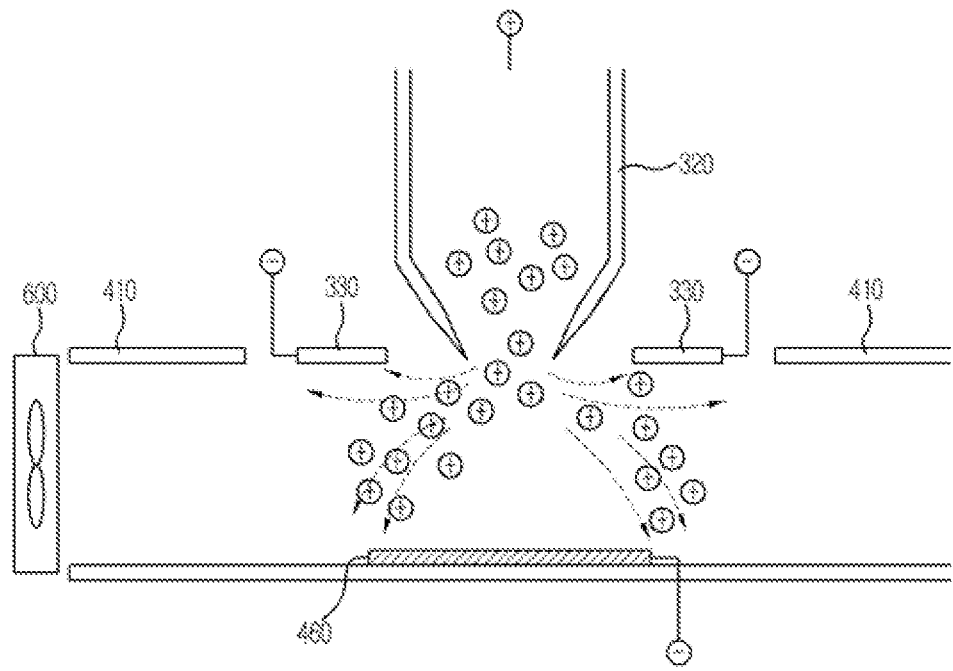
FIGS. 12A and 12B show another illustration of the evaporation unit provided at the humidifier in accordance with an embodiment of the present disclosure.

FIG. 11A is a graph showing the evaporation distance according to the relative level of humidity at each different size of the droplets, and FIG. 11B is a table showing the evaporation distance according to the relative level of humidity and the amount of the air flow at each different size of the droplets.

Based on FIG. 11A and FIG. 11B, the length L' of the evaporation unit 400 needed for the evaporation of the droplet may be estimated by the evaporation time of the droplet at an inside the evaporation unit 400.

As illustrated on FIG. 11A and FIG. 11B, in a case when the relative level of humidity at the outlet port 440 of the evaporation unit 400 is maintained at above 80%, approximately less than 50 cm of the length of the evaporation unit 400 may be needed for the droplets each having the size of less than about 8 um to be completed evaporated.

Figure 12B:
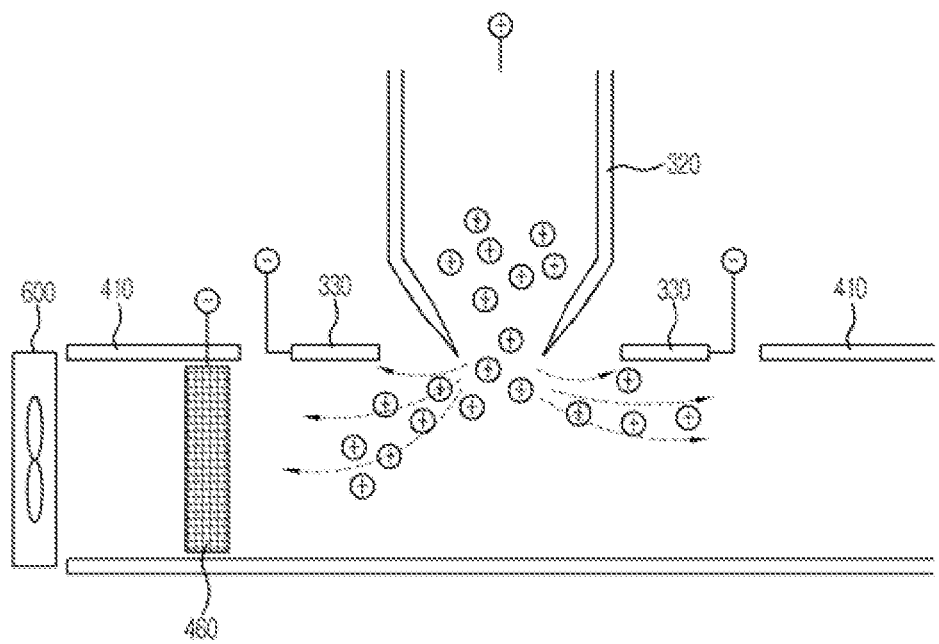

As illustrated on FIGS. 12A and 12B, the evaporation unit 400 may further include a third conductive member 460.

The third conductive member 460 is positioned at an inside the second housing 410 of the evaporation unit 400, and forms an electric field with respect to the sprayed droplets by being applied with the electric charge of an opposite polarity to the polarity of the first conductive member 318 is applied. That is, the third conductive member 460 is applied with the electric charge having the same polarity as the polarity of the second conductive member 330.

For example, in a case when the electric charge of a positive polarity is applied to the first conductive member 318, the third conductive member 460 may be applied with the electric charge of a negative polarity or grounded, and in a case when the first conductive member 318 is applied with the electric charge of a negative polarity or grounded to, the electric charge of a positive polarity is applied to the third conductive member 460.

As illustrated on FIG. 12A and FIG. 12B, the third conductive member 460 as such may be vertically or horizontally installed at an inside the evaporation unit 400.

As illustrated on FIG. 12B, in a case when the third conductive member 460 is vertically installed at an inside the evaporation unit 400, the air flow generated at the blower unit 600 by the electrode member 460 may be blocked, and thus the third conductive member having a shape of a mesh is being used so that air may be moved at an inside the evaporation unit 400.

A negative voltage having a magnitude larger than the voltage of the second conductive member 330 is applied to the third conductive member 460, and thus exerts an attractive force on the droplets, which move toward the side of the second conductive member 330 while each having a positive polarity.

By using the electrical moving velocity that enables the electrically-charged droplets sprayed as such to be moved toward the side of the third conductive member 460, the relative velocity of the air blowing from the blower unit 600 is increased, and thus the evaporation time of the droplets may be reduced.

In addition, according to the reduction of the evaporation time, the length of the evaporation unit 400 may also be reduced, and thus the overall size of the humidifier may be reduced.

The above will be described by referring to FIG. 13.

Figure 13:
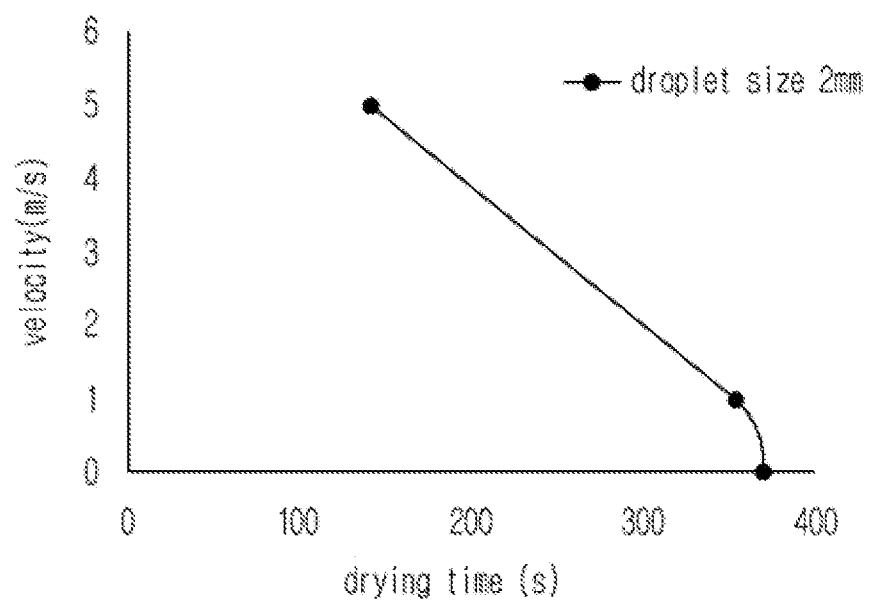
FIG. 13 is a graph showing the evaporation time of the droplets according to the relative velocity with respect to the surrounding air at an inside the evaporation unit provided at the humidifier in accordance with an embodiment of the present disclosure.

FIG. 13 is a graph showing the change of the evaporation time according to the relative velocity of the droplets with respect to air, while each droplet is provided with a size of about 2 mm in diameter, and when the relative velocity with respect to the air is increased to about 5 m/s, the evaporation time of the droplets is reduced about 40%.

The evaporation unit 400 may further include a tray 450.

Figure 14:
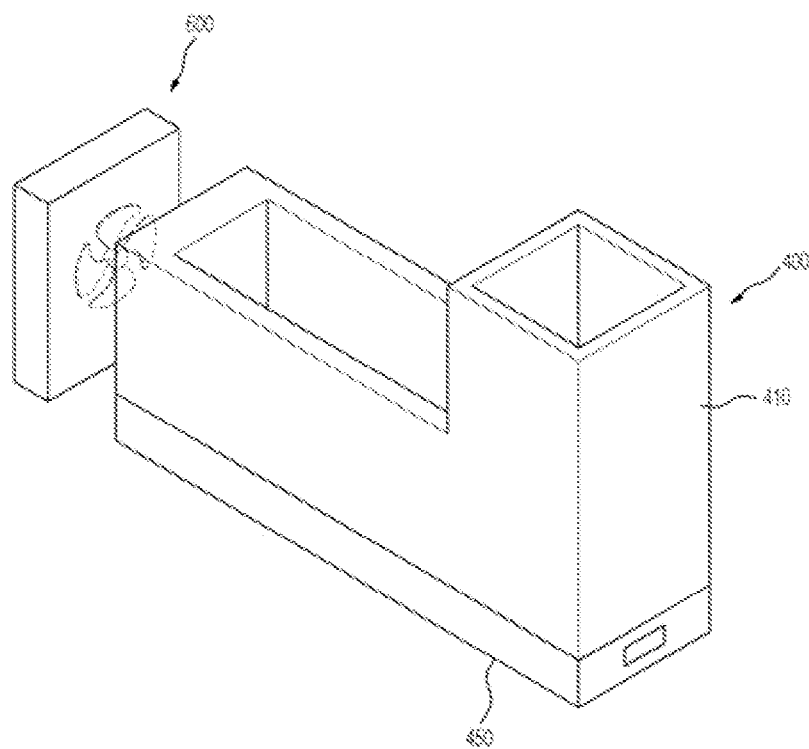
FIG. 14 is still another illustration of the evaporation unit provided at the humidifier in accordance with an embodiment of the present disclosure.
Figure 15:
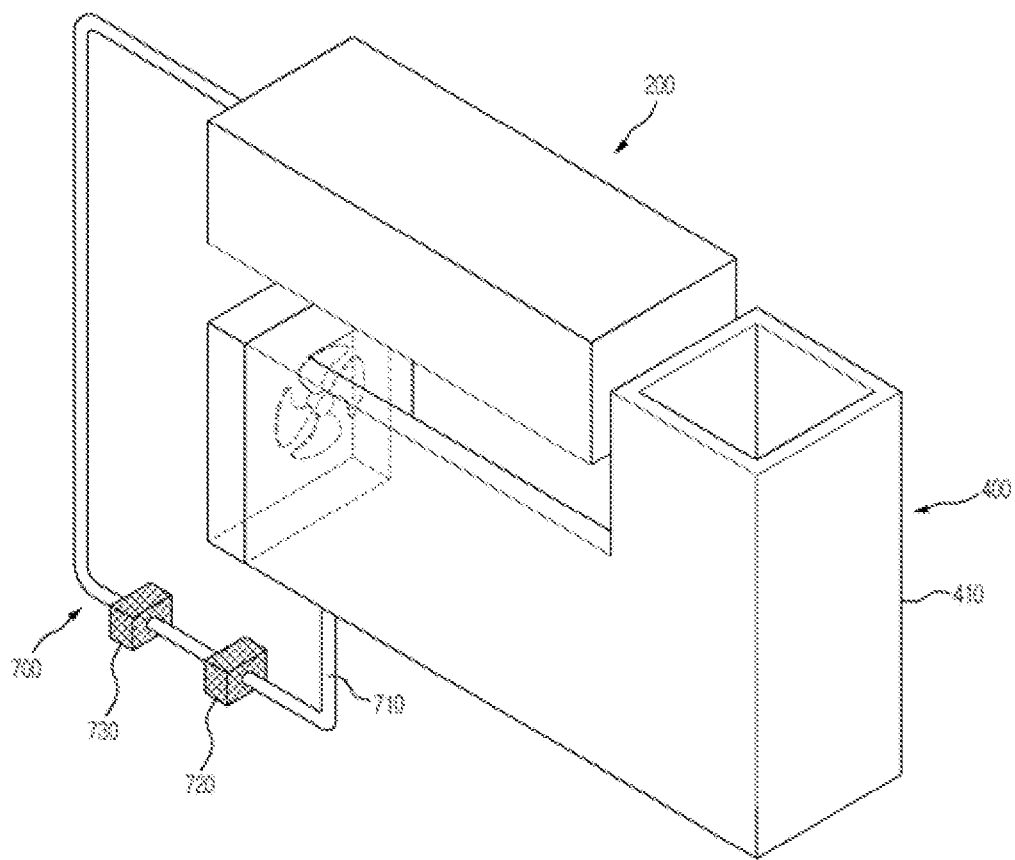
FIG. 15 is another illustration of the humidifier in accordance with an embodiment of the present disclosure.

As illustrated on FIG. 14, at a lower side of the second housing 410 of the evaporation unit 400, the tray 450 is disposed. The tray 450 is configured to store the electrically-charged droplets, which are not discharged to the outside, among the electrically-charged droplets being sprayed through the spray unit 300, and the vapor that are not discharged to an outside, and also store the electrically-charged droplets, that are collected at the dust collection unit 500 and run down, are stored at the tray 450.

In addition, the tray 450, in a case of a cleaning mode of the humidifier, stores the water that runs down from the second housing 410 of the evaporation unit 400 and the dust collection unit 500.

The tray 450 may be separated from the second housing 410. The tray 450 as such is separated by a user, and the stored water is removed by the user at a later time.

The humidifier may further include a circulation unit 700.

As illustrated on FIG. 15, the circulation unit 700 is configured to circulate the water stored at the second housing 410 to the water storage chamber 200, and includes a second pipe 710, a filter 720, and a pump 730.

The second pipe 710 is positioned in between the second housing 410 and the water storage chamber 200, and connects the second housing 410 to the water storage chamber 200.

The second pipe 710 guides the water at an inside the second housing 410 to the water storage chamber 200.

At this time, the water at an inside the second housing 410 is referred to as the water that contains the electrically-charged droplets, which are not being discharged to an outside, among the electrically-charged droplets sprayed during a humidification mode, the vapor that is not being discharged to an outside, and the electrically-charged droplets that are run down after being collected at the dust collection unit 500. In addition, the water at an inside the second housing 410 is referred to as the water running down from the second housing 410 of the evaporation unit 400 and the dust collection unit 500 during a cleaning mode of the humidifier.

The filter 720 is positioned at the second pipe 710, and filters the foreign substance in the water that is being supplied from the second housing 410 to the water storage chamber 200.

The pump 730 is driven according to the commands of a control unit, and delivers the water to the water storage chamber 200 by pumping the water at an inside the second housing 410. At this time, the water being supplied to the pump 730 is referred to as the water that is filtered through the filter 720.

That is, the water storage chamber 200 reuses the water, which is being introduced through the second pipe 710, for humidification.

Here, the pump 730, by performing a pumping operation, may apply pressure to the water at an inside the water storage chamber 200. At this time, pressure is applied to the water at an inside the water storage chamber, and by the pressure as such, water is discharged through the nozzles.

The dust collection unit 500 is positioned adjacent to the ejection unit 110, which is an end portion of the outlet port 440. In addition, the dust collection unit 500 may be disposed at the surroundings of the outlet port 440 at an inside the second housing 410.

As illustrated on FIG. 9, the shape of the dust collection unit 500 corresponds to the shape of the evaporation unit 400. The dust collection unit 500 as such comes in close contact with an inside of the evaporation unit 400 or with an end portion of the evaporation unit 400. As a result of the above, the vapor at an inside the evaporation unit 400 may be prevented from being directly ejected to an outside.

The dust collection unit 500 collects the electrically-charged droplets and the foreign substance that are being moved from an inside the evaporation unit 400 to an outside.

That is, the dust collection unit 500 electrically collects the droplets that are not evaporated from the evaporation unit 400, as well as the particles of the foreign substance such as micro-organisms, mineral particles, harmful chemical substance that remain after the evaporation is performed. As a result of the above, only vapor may be ejected to an outside.

The dust collection unit 500 as such forms an electric field as to collect the foreign substance and the droplets that are not evaporated. The above will be described by referring to FIGS. 16A to 16D.

As illustrated on FIG. 16A, the dust collection unit 500 includes a first dust collection member 510 to which the electric charge of an opposite polarity to the polarity of the first conductive member 318 is applied, and a second dust collection member 520 to which the electric charge of an opposite polarity to the polarity of the first dust collection member 510 is applied. That is, the first dust collection member 510 is provided with an opposite polarity to the polarity of the electrically-charged droplets.

The first dust collection member 510 and the second dust collection member 520 may be formed of a conductive body allowing an electric charge to flow therethrough.

Here, the first dust collection member 510 is formed in a tube shape that corresponds to the shape of the evaporation unit 400, and the second dust collection member 520 is positioned at an inside the first dust collection member 510. As a result of the above, the area of the first dust collection member 510 is formed to be larger than the area of the second dust collection member 520.

That is, in a case when the droplets are electrically-charged with a positive polarity, as to maximize the collection of the foreign substance of a positive polarity that is separated from the droplets, the area of the first dust collection member 510 provided with an opposite polarity to the foreign substance is formed to be larger than the second dust collection member 520.

By the electric charge applied to the first dust collection member 510 and the second dust collection member 520, an electric field is formed at the both sides of the second dust collection member 520.

That is, by the electric field formed at the side of the outlet port 440 of the evaporation unit 400, the foreign substance at an inside the vapor and the electrically-charged droplets that move from an inside the evaporation unit 400 to an outside are collected. Only the neutral vapor is passed through the electric field, and is ejected to an outside.

FIG. 16B shows a simulation result of a trace 'T' of the electrically-charged particles at an inside the dust collection unit 500. Here, the particles include the droplets that are not evaporated, as well as the particles of the foreign substance, which remain after the evaporation of the droplets, such as bacteria, micro-organisms, and mineral particles.

As for the size of the particle substance that remains after the evaporation of the droplets, the bacteria-based micro-organism has a size of about 1 um to 3 um, and the mineral particle has a size of about less than 0.5 um, and the particle substance is provided with the same electric charge as the electric charge of the initially sprayed droplet having the size of about less than 5 um. Because of the above, the dust collection unit 500 may be able to remove about 100% of the particle substance that is being introduced.

The dust collection unit 500 may be formed in a shape of a mesh.

In addition, the dust collection unit 500 may be implemented using a filter or a cyclone, both of which may be applied with an electric field.

Figure 16A:
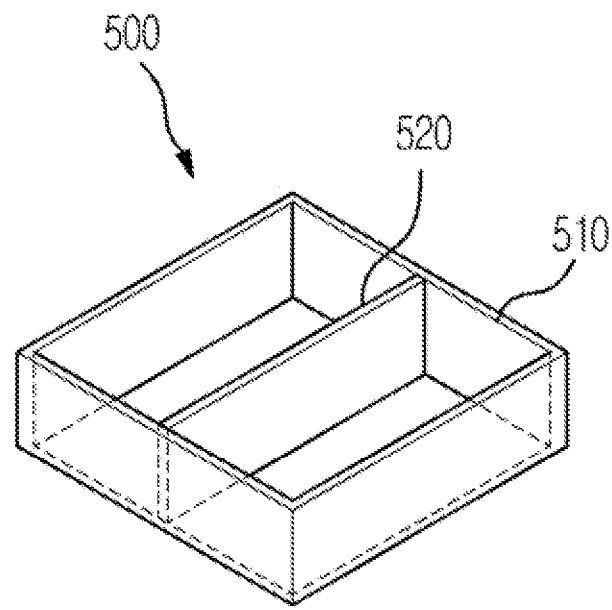
FIGS. 16A to 16D are illustrations of a dust collection unit provided at the humidifier in accordance with an embodiment of the present disclosure.
Figure 16B:
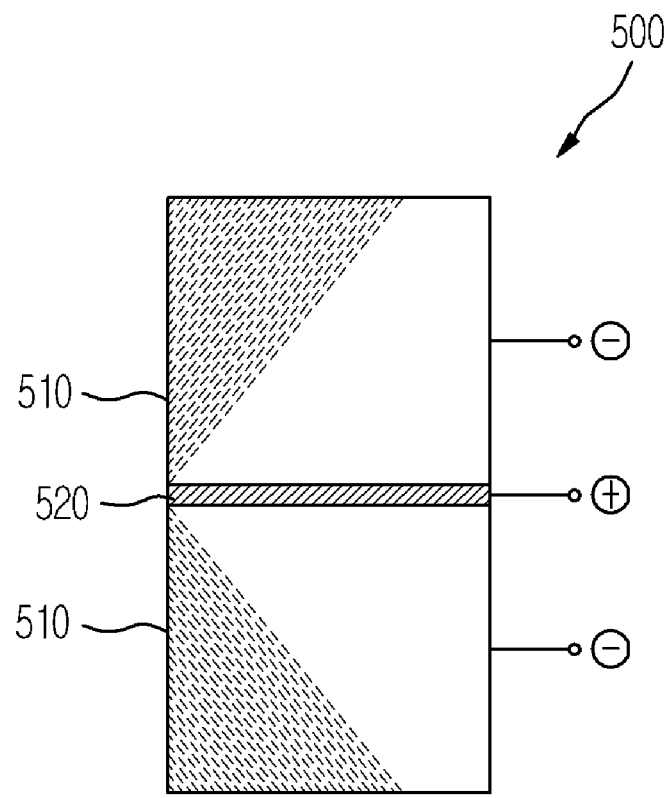
Figure 16C:
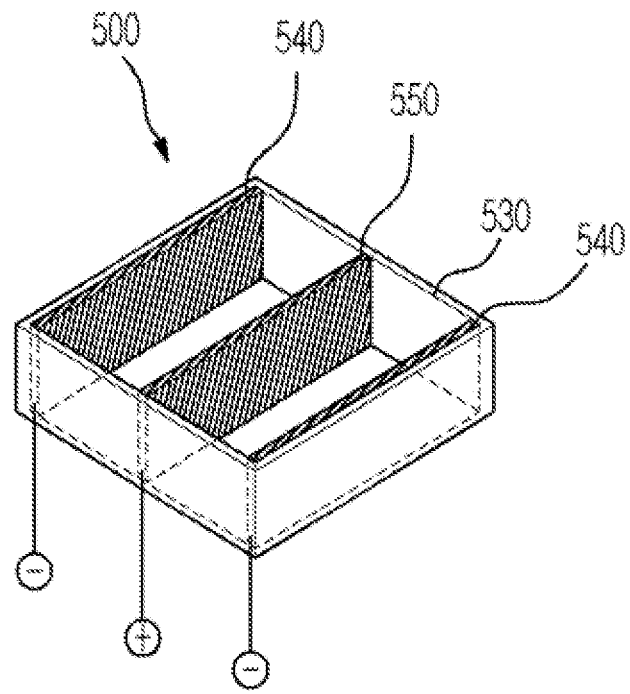

As illustrated on FIG. 16C, the dust collection unit 500 includes a third housing 530 formed in a shape of a rectangular box that corresponds to the shape of the outlet port of the evaporation unit 400, a plurality of first dust collection members 540 mounted at inner circumferential surfaces that faces each other among inner circumferential surfaces of the third housing 530 while applied with the electric charge of an opposite polarity to the polarity of the first conductive member 318, and a second dust collection member 550 disposed in between the plurality of first dust collection members 540 while applied with the electric charge of an opposite polarity to the polarity of the plurality of first dust collection members 540. That is, the plurality of first dust collection members 540 is provided with an opposite polarity with respect to the polarity of the electrically-charged droplets.

In addition, the plurality of first dust collection members 540 and the second dust collection members 550 are formed of conductive material through which the electric charge may flow, and each is formed in a shape of a panel.

By the electric charge applied to each of the plurality of first dust collection members 540 and the second dust collection member 550, an electric field each is formed in between the plurality of dust collection members 520 and the plurality of dust collection members 540.

As a result of the above, foreign substance is collected at the plurality of dust collection members 540 provided with an opposite polarity with respect to the polarity of the droplets. The foreign substance as such remains after vapor is evaporated from the droplets, and is provided with the polarity that is same as the polarity of the electrically-charged droplets. According to the above, the foreign substance is collected to the first dust collection members 540, which is provided with an opposite polarity to the foreign substance. In addition, the droplets at which evaporation is not occurred may be collected at the first dust collection member 540.

The vapor evaporated from the droplets is provided with a neutrality, and only the vapor of neutrality as such passes through the electric field, and is ejected to an outside.

Figure 16D:
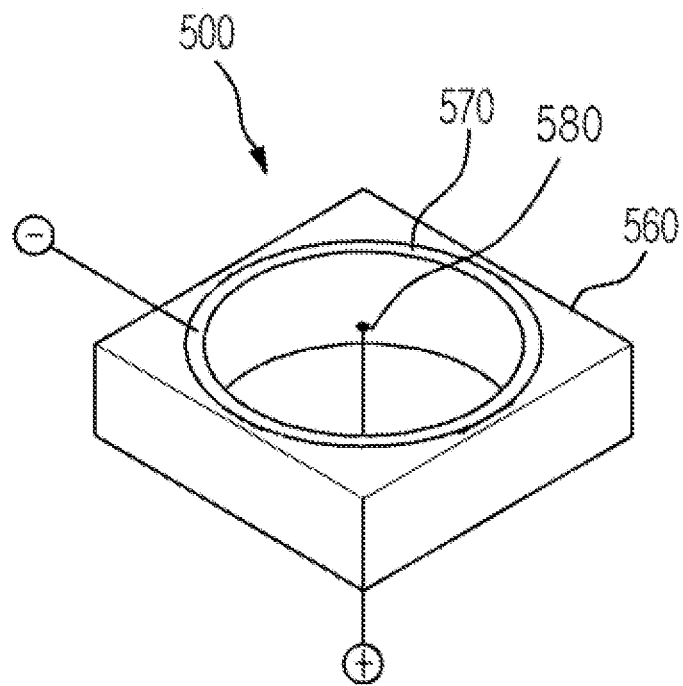

As illustrated on FIG. 16D, the dust collection unit 500 includes a third housing 560 formed in a shape of a rectangular box that corresponds to the shape of the outlet port of the evaporation unit 400 while provided with a cylinder-shaped collection hole formed at an inside thereof, a first dust collection member 570 mounted at an inner circumferential surface of the third housing 560 in a close contact manner while provided with the electric charge of an opposite polarity with respect to the polarity of the first conductive member 318, and a second dust collection member 580 disposed in the dust collection unit 570 while applied with the electric charge of an opposite polarity with respect to the first dust collection member 570.

The dust collection member 570 is provided with a polarity with respect to the polarity of the electrically-charged droplets while formed in a cylindrical shape, and the second dust collection member 580 is formed in a shape of a wire while penetrating the center of the cylinder-shaped first dust collection member 570.

In addition, the first dust collection member 570 and the second dust collection member 580 are formed with conductive material through which the electric charge may flow.

By the electric charge applied to the first dust collection member 570 and the second dust collection member 580, an electric field enabling an electrical charge to move toward the side of the first collection member 570 from the second dust collection member 580.

As a result of the above, foreign substance is collected at the cylinder-shaped dust collection member 570 provided with an opposite polarity with respect to the polarity of the droplets. In addition, at the first dust collection member 570, the droplets at which evaporation is not occurred may be collected. The vapor evaporated from the droplets is provided with a neutral status, and only the vapor as such is passed through the electric field, and is ejected to an outside.

Figure 17A:
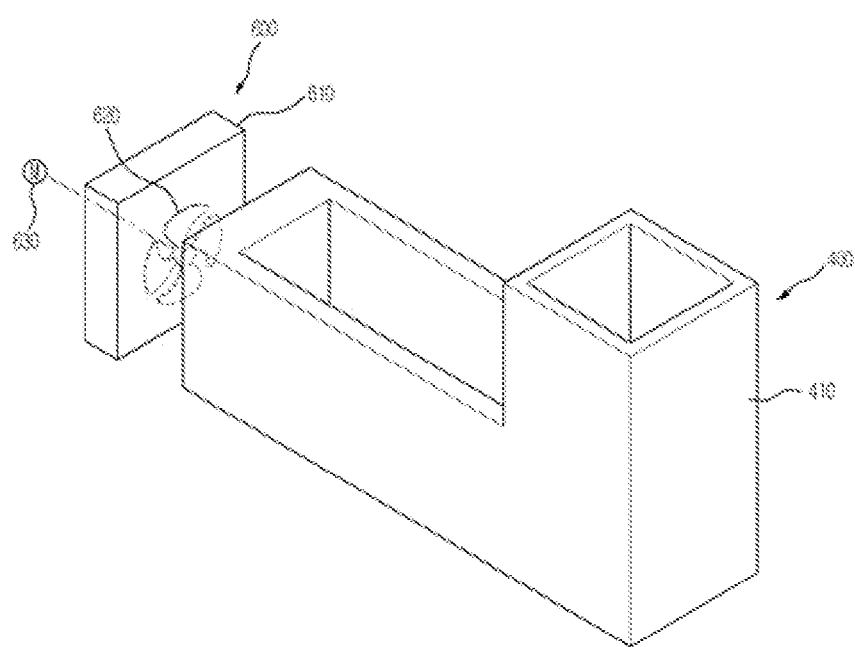
FIGS. 17A and 17B are illustrations of a blower unit provided at the humidifier in accordance with an embodiment of the present disclosure.
Figure 17B:
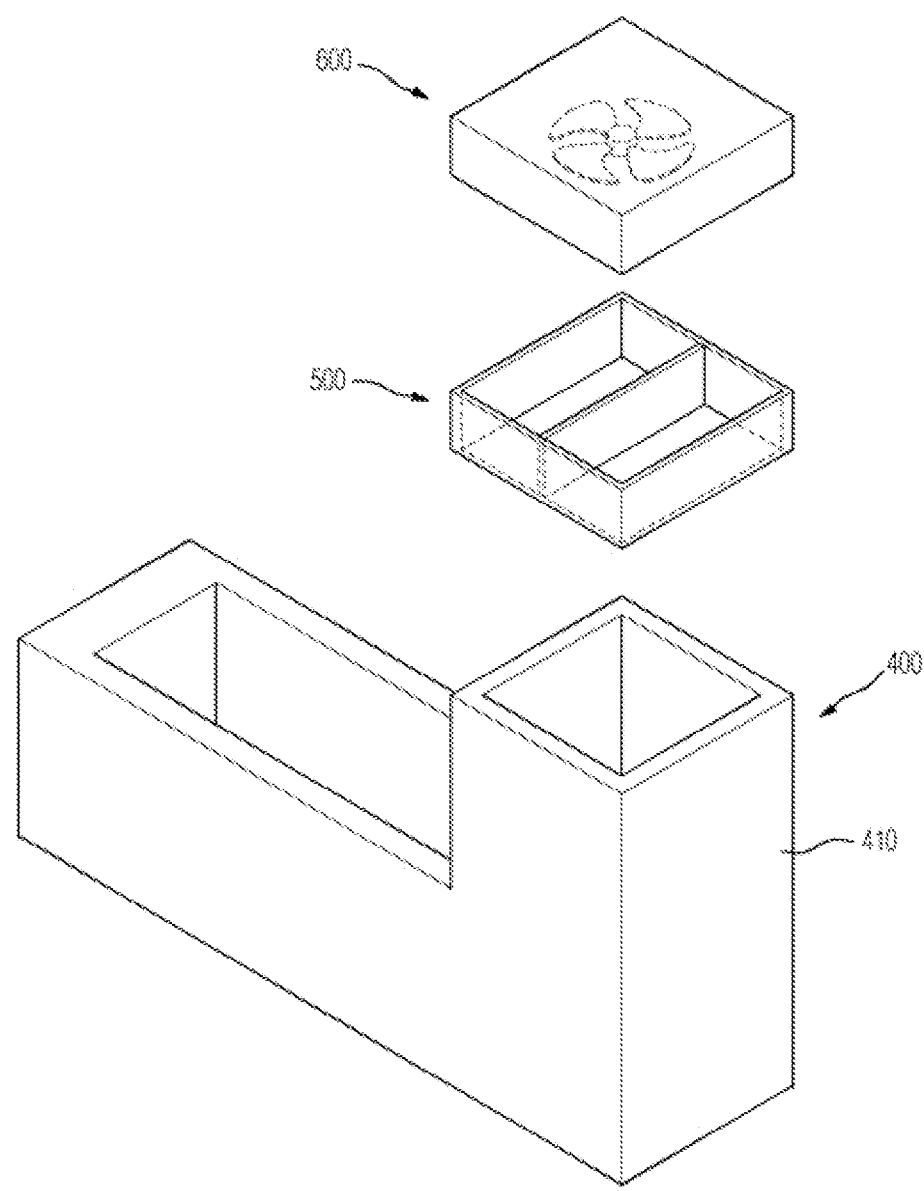
Figure 18:
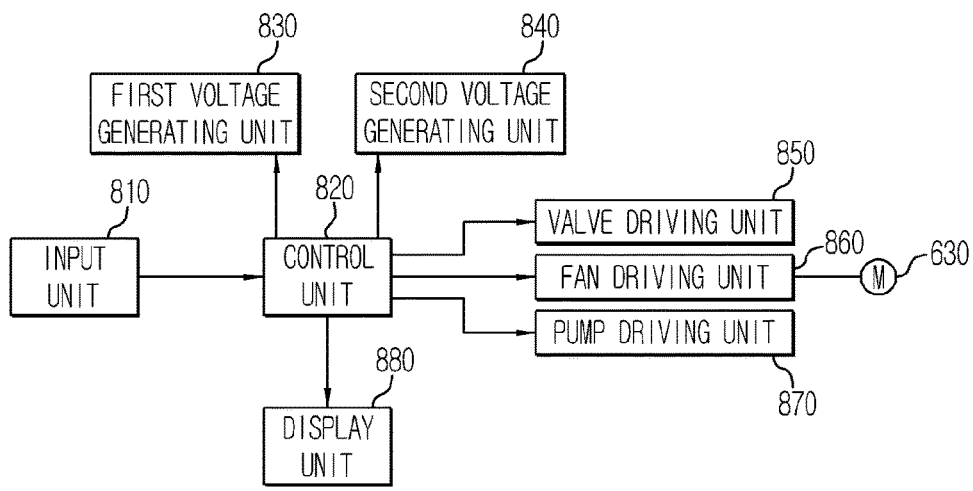
FIG. 18 is a control block diagram of the humidifier in accordance with an embodiment of the present disclosure.

As illustrated on FIGS. 17A and 17B, the blower unit 600 includes a third housing 610, a fan 620 disposed at an inside the third housing 610, and a motor 630 to rotate the fan 620.

The blower unit 600 is positioned at the surroundings of the evaporation unit 400, and is configured to enhance the evaporation of the electrically-charged droplets at an inside the evaporation unit 400 by introducing the dry air of an indoor to an inside the evaporation unit 400 at an inside the humidifier, and also to add a moving force to the vapor, the foreign substance, the electrically-charged droplets that are not evaporated, all of which are being moved toward the side of the outlet port 440.

The blower unit 600 may be installed in a way that the blowing direction may be perpendicular to the spraying direction of the spray unit 300. In addition, the blower unit 600 may be installed in a way that the blowing direction may be horizontal the spraying direction of the spray unit 300 in a forward/backward direction of the spraying direction.

The blower unit 600 includes the fan 620, and the fan 620 is configured to adjust the rotation velocity based on the selected mode and the amount of spray, the sizes of the nozzle 320 and the droplet, and a predetermined length of the evaporation unit 400. Here, the size of the droplet is determined by the size of the applied voltage.

As illustrated on FIG. 17A, the blower unit 600 is positioned adjacent to the evaporation unit 400, that is, at a position opposite the moving direction of the droplets at an inside the evaporation unit 400.

That is, the blower unit 600 is positioned at a location that is opposite to a location of the ejection unit 110 while interposing the evaporation unit 400 in between the blower unit 600 and the election unit 110.

According to the above, the droplets sprayed from the spray unit 300, by using the blowing force of the blower unit 600, is evaporated while being moved toward the outlet port of the evaporation unit 400. At this time, the foreign substance that remains after evaporation of the droplets is completed is collected at the dust collection unit 500, and only the vapor that is evaporated is passed through the dust collection unit 600, and is moved to an outside. Here, the blower unit 600 applies moving force to the droplets from an opposite side of the direction of the ejection of the vapor.

As illustrated on FIG. 17B, the blower unit 600 may be installed in between the dust collection unit 500 and the ejection unit 110.

The evaporation of the droplets is taken place at an inside the evaporation unit 400, and the vapor and the foreign substance that are separated from each other by the evaporation at an inside the evaporation unit 400 moves to the outlet port 440 of the evaporation unit 400. At this time, the foreign substance is collected at the dust collection unit 500, and only the vapor, which is not collected at the dust collection unit 500, is passed through the blower unit 600, and then is ejected through the ejection unit 110. Here, the blower unit 600 applies moving force to the droplets from the ejection unit 110.

As illustrated on FIG. 17A and FIG. 17B, the blower unit 600 and the spray unit 300 are disposed at opposite each other with respect to the spraying position of the spray unit 300 and the ejection direction of the vapor. Thus, as to apply moving force to the droplets at an inside the evaporation unit 400, the rotation direction of the fan is needed to be controlled to be different depending on the position of the blower unit 600.

FIG. 18 is a control block diagram of the humidifier in accordance with an embodiment of the present disclosure.

The humidifier includes an input unit 810, a control unit 820, a first voltage generating unit 830, a second voltage generating unit 840, a valve driving unit 850, a fan driving unit 860, a pump driving unit 870, and a display unit 880.

The input unit 810 includes a power ON/OFF button and a mode selection button. Here, the mode includes a humidification mode and a cleaning mode.

The input unit 810 is configured to be input with the commands such as a humidification mode ON/OFF selection and a cleaning mode selection.

The control unit 820, when the humidification ON mode is selected, performs the humidification mode, when the humidification OFF mode is selected, releases the humidification mode, and when the cleaning mode is selected, performs the cleaning mode during a predetermined cleaning time.

The control unit 820 may also perform the cleaning mode according to a predetermined period.

The control unit 820, when the humidification mode is selected, controls the valve 240 at an ON status, so that the flow path of the first pipe 230 is open. As a result of the above, the water at an inside the water storage chamber 200 is moved to the spray unit 300. At this time, according to the amount of the spraying selected by a user, the opening degree of the valve 240 may be controlled.

In addition, the control unit 820, when the humidification mode is selected, controls the first voltage generating unit 830, so that a high voltage, for example about 15 kV may be applied to the second conductive member 330 and the first conductive member 318, and controls the second voltage generating unit 840, so that a high voltage, for example about 1 kV/cm may be applied to the second dust collection member 520 and the first dust collection member 510.

In a case when the third conductive member 460 is provided at the humidifier, the control unit 820 controls the second voltage generating unit 840, so that a voltage may be applied to the third conductive member 460.

As a result of the above, through the spray unit 300, water is sprayed, and the foreign substance included in the sprayed droplets may be removed.

In addition, by using the moving velocity of the electrically-charged droplets, the relative velocity with respect to the air blowing from the blower unit 600 is increased, and thus the evaporation time of the droplets may be reduced.

The control unit 820, when the humidification mode is selected, based on the amount of the spraying, a predetermined size of the droplet, and a length of the evaporation unit, controls the fan driving unit 860, so that the velocity of the fan 620 of the blower unit 600 is adjusted. As a result of the above, the evaporation of the electrically-charged droplets may be maximized.

The control unit 820, when the cleaning mode is selected, controls the fan driving unit 860 such that the evaporation of the electrically-charged droplets may be minimized, controls the valve 240 at a ON status such that the flow path of the first pipe 230 is open, and if a predetermined cleaning time is expired, controls the fan to be stopped, and controls the valve 240 at a OFF status such that the flow path of the first pipe 230 is closed.

The control unit 820 controls the rotation velocity of the fan during the cleaning mode to be slower than the rotation velocity of the fan during the humidification mode, so that the evaporation of the electrically-charged droplets may be minimized.

In addition, the control unit 820, when the cleaning mode is selected, controls the first voltage generating unit 830 such that a high voltage may be applied to the second conductive member 330 and the first conductive member 318, controls the second voltage generating unit 840 such that a high voltage may be applied to the second dust collection member 520 and the first dust collection member 510, and if a predetermined cleaning time is expired, controls the voltage being applied to the first and the second voltage generating units 830 and 840 to be blocked.

As a result of the above, by having most of the electrically-charged droplets collide with the second housing 410 of the evaporation unit 400 and thus run down to the bottom without being ejected to an outside, or by having the most of the electrically-charged droplets run down to the bottom of the evaporation unit 400 as a result of the blocking of the voltage after the electrically-charged droplets are collected at the dust collection unit 500, the inside the second housing 410 is cleaned.

The control unit 820, when a predetermined period passes, controls the driving of the pump 730, so that the water stored at the evaporation unit 400 may be supplied again to the water storage chamber 200.

The first voltage generating unit 830 is provided with a first terminal and a second terminal, and through the first terminal and the second terminal, a positive voltage and a negative voltage are output.

The first terminal is connected to the first conductive member 318 to apply the electric charge to the first conductive member, and the second terminal is connected to the second conductive member 330 to apply the electric charge to the second conductive member.

For example, in a case when the electric charge of a positive polarity is output to the first terminal and the electric charge of a negative polarity is output to the second terminal, the first terminal applies the positive voltage to the first conductive member 318 and the second terminal applies the negative voltage to the second conductive member 330.

The second voltage generating unit 840 is provided with a third terminal and a fourth terminal, and through the third terminal and the fourth terminal, a positive voltage and a negative voltage are output.

The third terminal is connected to the first dust collection member 510 to apply the electric charge to the first dust collection member 510, and the fourth terminal is connected to the second dust collection member 520 to apply the electric charge to the second dust collection member 520.

For example, in a case when the electric charge of a negative polarity is output to the third terminal and the electric charge of a positive polarity is output to the fourth terminal, the third terminal applies the negative voltage to the first dust collection member 510 and the fourth terminal applies the positive voltage to the second dust collection member 520.

In addition, the first voltage generating unit 830 may further include a fifth terminal.

Here, the fifth terminal is connected to the third conductive member 460, and applies the electric charge of an opposite polarity to the polarity being applied to the first conductive member 318 to the third conductive member 460.

If the electric charge of a positive polarity is applied to the first conductive member 318 and the electric charge of a negative polarity is applied to the second conductive member 330, the electric charge of a negative polarity is applied to the third conductive member 460. At this time, the magnitude of the negative voltage being applied to the third conductive member 460 is larger than the magnitude of the negative voltage being applied to the second conductive member 330.

The reason of the above is to have the electrically-charged droplets provided with a positive polarity move to the third conductive member 460 having a larger potential difference.

The valve driving unit 850 adjusts the ON/OFF of the valve 240 and the opening degree of the valve 240 according to the commands of the control unit 820, and the fan driving unit 860 rotates the motor 630 according to the commands of the control unit 820 to adjust the rotation velocity of the fan 620 of the blower unit 600. As a result of the above, the amount of air is adjusted.

The pump driving unit 870 drives the pump 730 according to the commands of the control unit 820.

The display unit 880 displays the power ON/OFF, the amount of the water at an inside the water storage chamber 200, the selected amount of the spray, and the selected mode according to the commands of the control unit 820.

The humidifier may further include a water level sensor (not shown) configured to detect the water level at an inside the water storage chamber 200.

Figure 19:
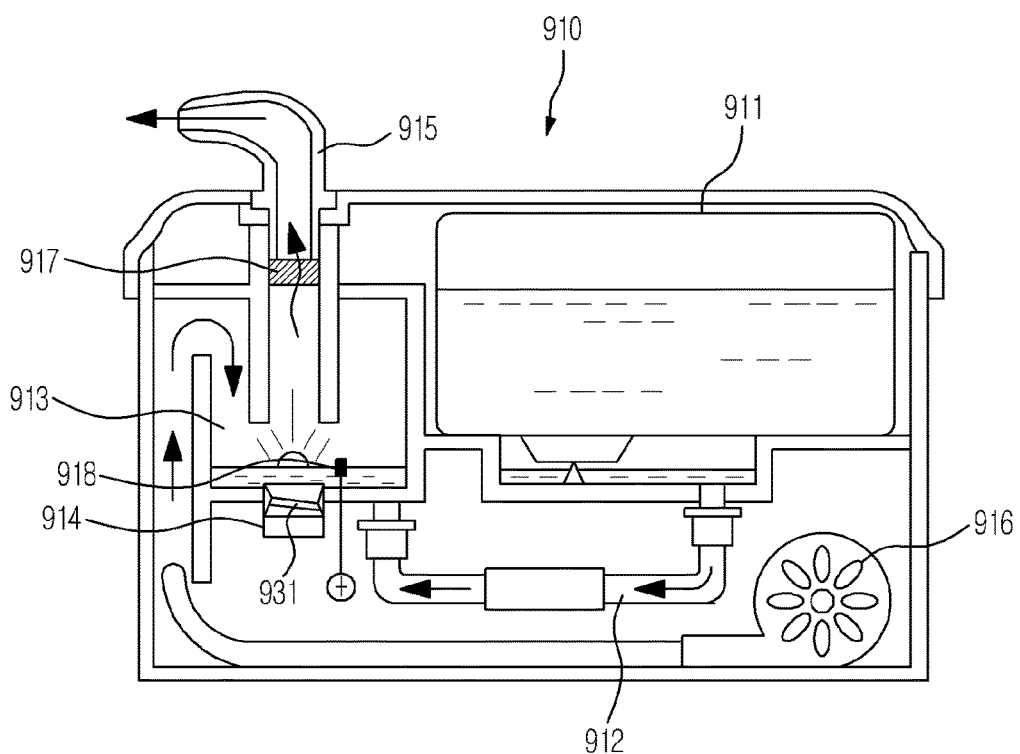
Figure 20:
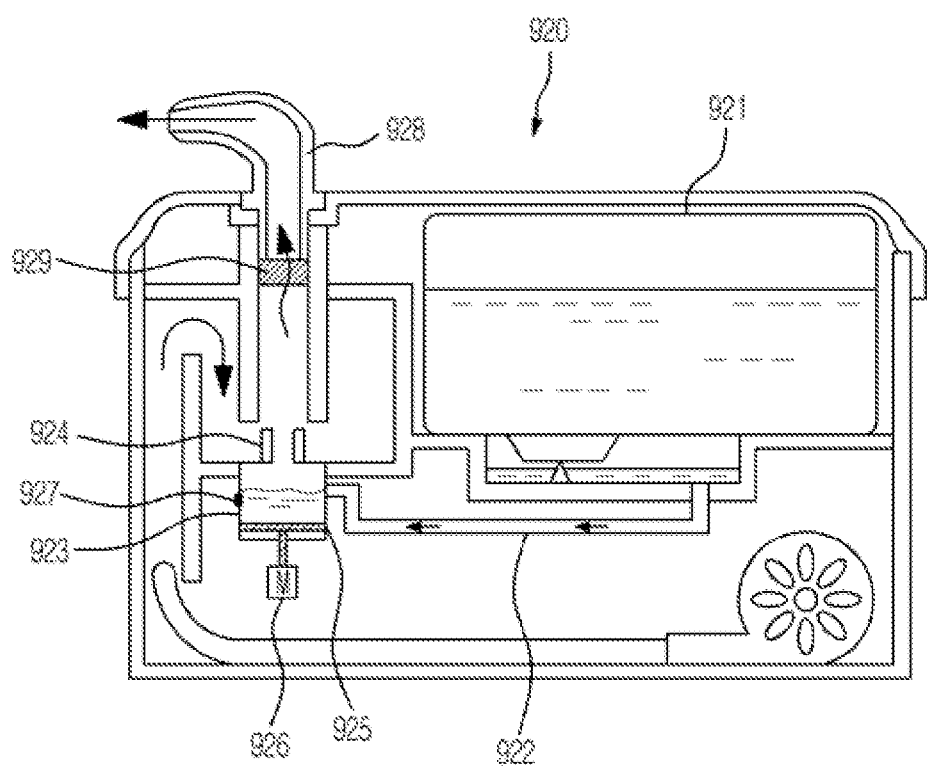

FIG. 19 is an illustration of a humidifier in accordance with another embodiment of the present disclosure. The humidifier in accordance with another embodiment is referred to as a ultrasonic-type humidifier.

A humidifier 910 in accordance with another embodiment of the present disclosure includes a water storage chamber 911 to store water, a pipe 912 to deliver the water to the water storage chamber 911 to a spray chamber 913, the spray chamber 913 to store the water supplied through the pipe 912, a spray unit 914 to change the water at an inside the spray chamber 913 in a form of microscopic droplets and spray the changed water, a duct 915 configured to guide the microscopic droplets to the outside, a blower unit 916 to add a moving force to the microscopic droplets, and a dust collection unit 917 to collect foreign substance included in the microscopic droplets.

The spray unit 914 further includes a first conductive member 918 to electrically charge water to spray the water in a form of the electrically-charged droplets.

The first conductive member 918 is disposed at the spray chamber 913, and applies high voltage of a positive polarity to the water at an inside the spray chamber 913. As a result of the above, the water at an inside the spray chamber 913 becomes the water provided with a positive polarity. That is, the water provided with a positive polarity is sprayed in a form of the electrically-charged droplets by an ultrasonic wave.

More in detail, the spray unit 914 includes a vibration unit 931 including a vibrator and a vibration panel.

The spray unit 914 as such changes the size of the vibrator according to the frequency that corresponds to the AC current, and based on the size change of the vibrator, the vibration panel in contact with the vibrator is vibrated, and according to the vibration of the vibration panel, an ultrasonic wave is generated, and through the generated ultrasonic wave, the electrically-charged water is vibrated. At this time, the electrically-charged water is reduced into microscopic sizes, and is changed into a state of the electrically-charged droplets, and the electrically-charged droplets are ejected to an outside through the duct 915.

At this time, evaporation is taken place at the electrically-charged droplets being sprayed toward the side of the duct 915, and by the blower unit 914, evaporation is accelerated. That is, the electrically-charged droplets, in a state of being separated into the neutral vapor and the electrically-charged foreign substance by the evaporation, are passed through the duct 915.

At this time, at the dust collection unit 917 provided at an inside the duct 915, the foreign substance is collected. As a result of the above, only clean vapor is ejected into an indoor.

Here, the dust collection unit 917 is same as the dust collection unit 500 of an embodiment of the present disclosure, and thus the description thereof will be omitted.

FIG. 20 is an illustration of a humidifier in accordance with still another embodiment of the present disclosure. The humidifier in accordance with still another embodiment is referred to as pressure-type humidifier.

A humidifier 910 in accordance with another embodiment of the present disclosure includes a water storage chamber 921 to store water, a pipe 922 to deliver the water at the water storage chamber 921 to a spray chamber 923, a spray unit to spray the water supplied through the pipe 922 in a form of droplets, a duct 928 to guide the sprayed droplets to an outside, and a dust collection unit 929 to collect foreign substance from an inside the microscopic droplets.

Here, the spray unit includes the spray chamber 923 to store the water supplied through the pipe 922, a nozzle 924 through which the water at an inside the spray chamber 923 is sprayed, a piston 925 to pressurize the water at an inside the spray chamber 923 so that the water at an inside the spray chamber 923 may be sprayed through the nozzle 924, a motor 926 to apply moving force to the piston 925, and a first conductive member 927 to apply voltage of a positive polarity to the water at an inside the spray chamber 923.

More in detail, at the spray chamber 923, the first conductive member 927, to which high voltage of a positive polarity is applied, is disposed. As a result of the above, the high voltage is applied to the water at an inside the spray chamber 923, and the water at an inside the spray chamber 923 becomes the water provided with positive polarity.

As the humidification mode is selected, the motor 926 is rotated, and when moving force is applied to the piston 925 at an inside the spray chamber 923, the piston 925 is moved toward the nozzle 924 and applies pressure to the water of a positive polarity at an inside the spray chamber 923. At this time, by the pressurization of the piston 925, the water of a positive polarity at an inside the spray chamber 923 is sprayed in a state of electrically-charged microscopic droplets through the nozzle 924.

The electrically-charged droplets being sprayed toward the side of the duct 915 is separated into neutral vapor and electrically-charged foreign substance as evaporation is taken place, and while in a state of being separated into the vapor and the foreign substance, the electrically-charged droplets pass through the duct 928.

At this time, at the dust collection unit 929 provided at an inside the duct 928, the foreign substance is collected. As a result of the above, only clean vapor is ejected into an indoor. Here, the dust collection unit 929 is same as the dust collection unit 500 of an embodiment of the present disclosure, and thus the description thereof will be omitted.

As the above, by using electrical force of the dust collection unit, the foreign substance may be removed from the droplets. As a result of the above, the cleanliness of the humidification may be enhanced.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A humidifier, comprising:
 a spray unit configured to electrically charge water having foreign substance, and to spray the electrically-charged water in a form of droplets, the spray unit comprising:
  a body comprising an accommodation unit to accommodate water, and a plurality of insertion holes;
  a first conductive member installed in the body and configured to electrically charge the water having the foreign substance;
  a plurality of nozzles respectively inserted into the plurality of insertion holes, and each configured to spray the water of the accommodation unit after being supplied with the water of the accommodation unit; and
  a second conductive member installed spaced apart by a predetermined distance from the body, the second conductive member being provided with a plurality of nozzle holes each formed at a corresponding position to each of the plurality of nozzles, and to which an electric charge having a different polarity from a polarity of the first conductive member is being applied thereby forming a first electric field between the first conductive member and the second conductive member;
 an evaporation unit formed with a duct in which the electrically-charged droplets sprayed are changed from a liquid state into vapor in a gas state, and which is configured to guide the changed vapor and the foreign substance, which is included in the electrically-charged water, to an outside; and
 a third conductive member installed in the duct and spaced apart from the second conductive member to which an electric charge having a different polarity from the polarity of the first conductive member is being applied, and configured to form a second electric field between the first conductive member and the third conductive member, the third conductive member being configured to add a relative velocity to the electrically-charged droplets to increase a transit time of the droplets through the duct to promote the changing of the droplets from the liquid state into the vapor.

2. The humidifier of claim 1, further comprising:
 a dust collection unit configured to collect the foreign substance in the duct by forming an electric field.

3. The humidifier of claim 2, wherein:
 the duct is configured to guide electrically-charged droplets, which are not evaporated among the electrically-charged droplets that are being sprayed, to the outside, and the dust collection unit is configured to collect the electrically-charged droplets that are not evaporated.

4. The humidifier of claim 2, further comprising:
 a blower unit configured to introduce outside air into the duct, and to add moving force to the electrically-charged droplets.

5. The humidifier of claim 4, further comprising:
 an input unit configured to input a cleaning mode; and
 a control unit, when the cleaning mode is input, configured to control a rotation velocity of the blower unit so that the evaporation of the electrically-charged droplets is decreased.

6. The humidifier of claim 2, further comprising:
 a water storage chamber configured to store water and to supply the stored water to the spray unit; and
 a first pipe connected in between the water storage chamber and the spray unit, and configured to guide the water stored at the water storage chamber to the spray unit.

7. The humidifier of claim 6, further comprising:
 a valve disposed at the first pipe and configured to adjust an opening degree of the first pipe so that a flow rate of water being supplied from the water storage chamber to the spray unit is adjusted.

8. The humidifier of claim 7, further comprising:
 an input unit configured to input a humidification mode and an amount of spraying; and
 a control unit, when the humidification mode and the amount of the spraying are input, configured to control the opening degree of the valve based on the amount of the spraying being input.

9. The humidifier of claim 6, further comprising:
 a tray configured to store the electrically-charged droplets, which are not evaporated among the electrically-charged droplets being sprayed.

10. The humidifier of claim 6, further comprising:
 a second pipe connected in between the water storage chamber and the duct;
 a pump disposed at the second pipe and configured to pump the water of the duct to supply the water to the water storage chamber; and
 a filter disposed at the second pipe and configured to filter the water to supply the filtered water to the pump.

11. The humidifier of claim 1, wherein:
 the plurality of nozzles is separated from the plurality of insertion holes.

12. The humidifier of claim 1, further comprising:
 a first voltage generating unit configured to apply voltage to the first conductive member and the second conductive member.

13. The humidifier of claim 1, further comprising:
 an array member provided with the plurality of nozzles disposed thereto.

14. The humidifier of claim 2, wherein:
 the dust collection unit comprises:
 a first dust collection member to which an electric charge having a polarity different from a polarity of the electrically-charged water is being applied; and
 a second dust collection member to which an electric charge having a polarity different from the polarity of the first dust collection member is being applied.

15. The humidifier of claim 14, wherein:
 the first dust collection member is positioned in close contact with the duct, and the second collection member is positioned at an inside of the first dust collection member.

16. The humidifier of claim 14, further comprising:
a second voltage generating unit configured to apply voltage to the first dust collection member and the second dust collection member so that an electric field is formed in between the first dust collection member and the second dust collection member.

17. The humidifier of claim 2, wherein:
a length of the duct is sufficient to allow complete evaporation of the droplets, based on a size of the droplets, the airflow through the duct, and an evaporation time of the droplets.

18. The humidifier of claim 2, wherein the spray unit comprises:
a spray chamber configured to store water, the first conductive member being provided at an inside of the spray chamber;
a piston disposed at the inside of the spray chamber to pressurize water; and
a nozzle configured to spray the water pressurized by the piston in a state of electrically-charged droplets.

19. The humidifier of claim 2, wherein:
the dust collection unit comprises a filter at which an electric field is formed.

20. The humidifier of claim 2, wherein:
the dust collection unit comprises a cyclone at which an electric field is formed.

21. The humidifier of claim 2, wherein:
the spray unit comprises a body provided with an accommodation unit to accommodate water formed thereto, and a plurality of insertion holes formed thereto; and a plurality of nozzles respectively inserted into the plurality of insertion holes, and each configured to spray the water of the accommodation unit after being supplied with the water of the accommodation unit,
the first conductive member is positioned at the accommodation unit, and
the second conductive member is installed spaced apart by a predetermined distance from the body, and is provided with a plurality of nozzle holes each formed thereto at a corresponding position to the each of the plurality of nozzles.

22. The humidifier of claim 21, further comprising:
a first voltage generating unit configured to apply a high voltage to the first conductive member, the second conductive member, and the third conductive member,
wherein the first voltage generating unit is configured to apply a larger voltage difference between the first conductive member and the third conductive member than between the first conductive member and the second conductive member.

23. The humidifier of claim 2, wherein:
the dust collection unit comprises a first dust collection member to which an electric charge having a polarity different from the polarity of the first conductive member is being applied, and a second dust collection member to which an electric charge having a polarity different from the polarity of the first dust collection member is being applied, and
the humidifier further comprises a second voltage generating unit configured to apply voltage to the first dust collection member and the second dust collection member so that an electric field is formed in between the first dust collection member and the second dust collection member.

24. The humidifier of claim 23, wherein:
the first dust collection member comprises a plurality of first collection members, and
the first dust collection member is positioned in close contact with an inner circumferential surface of the duct, and the second dust collection member is positioned in between the first collection members.

25. The humidifier of claim 6, wherein the first pipe includes a plurality of pipes and the spray unit includes a plurality of spray assemblies that form the spray unit and are connected to the first pipe.

26. The humidifier of claim 6, wherein the first pipe include a plurality of branch pipes and the spray unit includes a plurality of spray assemblies that form the spray unit are connected to the first pipe, and a number of the branch pipes corresponds to a number of the spray assemblies.

27. The humidifier of claim 14, wherein the second dust collection member is formed of a wire.

28. The humidifier of claim 2, wherein the spray unit comprises:
a spray chamber configured to store water, the first conductive member being provided at an inside the spray chamber;
a vibration unit configured to spray the electrically-charged water in the form of electrically-charged droplets by generating an ultrasonic wave;
a nozzle configured to spray the water in a state of electrically-charged droplets which is generated by the ultrasonic wave.

29. The humidifier of claim 2, wherein the third conductive member is vertically or horizontally installed at the inside of the duct.

* * * * *